(12) United States Patent
Yamaguchi

(10) Patent No.: US 7,257,270 B2
(45) Date of Patent: Aug. 14, 2007

(54) IMAGE PROCESSING DEVICE AND METHOD, AND RECORDING MEDIUM

(75) Inventor: Hiroshi Yamaguchi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 845 days.

(21) Appl. No.: 10/100,076

(22) Filed: Mar. 19, 2002

(65) Prior Publication Data

US 2002/0131649 A1 Sep. 19, 2002

(30) Foreign Application Priority Data

Mar. 19, 2001 (JP) .............................. 2001-079238

(51) Int. Cl.
*G06K 9/40* (2006.01)

(52) U.S. Cl. ...................... 382/275; 382/274; 382/309; 382/317; 358/3.26; 358/505; 358/474

(58) Field of Classification Search ................ 382/260, 382/274, 275, 282, 309, 317; 358/3.26, 3.28, 358/463, 3.27, 505, 474
See application file for complete search history.

(56) References Cited

U.S. PATENT DOCUMENTS

| | | | | |
|---|---|---|---|---|
| 4,641,019 A | * | 2/1987 | Inatsuki | ................. 250/559.02 |
| 4,825,243 A | * | 4/1989 | Ito et al. | ......................... 355/41 |
| 5,210,600 A | * | 5/1993 | Hirata | .......................... 357/527 |
| 5,220,178 A | * | 6/1993 | Dreiling et al. | ......... 250/559.03 |
| 5,266,805 A | * | 11/1993 | Edgar | ........................... 250/330 |
| 5,309,256 A | * | 5/1994 | Takada et al. | ............... 358/504 |
| 5,371,614 A | * | 12/1994 | Ito | ............................... 358/487 |
| 5,429,137 A | * | 7/1995 | Phelps et al. | ................ 600/455 |
| 5,453,851 A | * | 9/1995 | Faulhaber | ..................... 358/481 |
| 5,710,951 A | * | 1/1998 | Wakabayashi et al. | ....... 396/311 |
| 5,745,143 A | * | 4/1998 | Edgar et al. | ................. 347/139 |
| 5,760,913 A | * | 6/1998 | Falk | ............................ 382/167 |
| 5,861,917 A | * | 1/1999 | Tariki et al. | .............. 348/230.1 |
| 5,861,943 A | * | 1/1999 | Seki | ............................. 355/40 |
| 6,048,066 A | * | 4/2000 | Inatome | ....................... 352/160 |
| 6,208,753 B1 | * | 3/2001 | Braudaway et al. | ......... 382/162 |
| 6,327,056 B1 | * | 12/2001 | Tsai et al. | .................... 358/474 |
| 6,505,977 B2 | * | 1/2003 | Corbin et al. | ................ 396/567 |
| 6,512,238 B1 | * | 1/2003 | Iwaki | ....................... 250/559.4 |

FOREIGN PATENT DOCUMENTS

JP 11075039 3/1999

* cited by examiner

*Primary Examiner*—Yosef Kassa
(74) *Attorney, Agent, or Firm*—Birch, Stewart, Kolasch & Birch, LLP

(57) ABSTRACT

In an image processing device which carries out processing for detecting and correcting defective portions of an image, it is possible to pre-emptively prevent the defective portion detecting and correcting processing from causing a deterioration in image quality or an excessive processing requiring time requirement. In cases in which a film type of a photographic film on which the image is recorded is a film type known to have a characteristic that an IR image is also formed at a time of image exposure and recording, and in cases in which a density distribution width of IR data is a predetermined value or more, defect detection-correction processing is cancelled. Further, in cases in which a non-image region is included in the image, either defect detection-correction is carried out only on regions other than the non-image region, or defective portion detection-correction is cancelled.

34 Claims, 10 Drawing Sheets

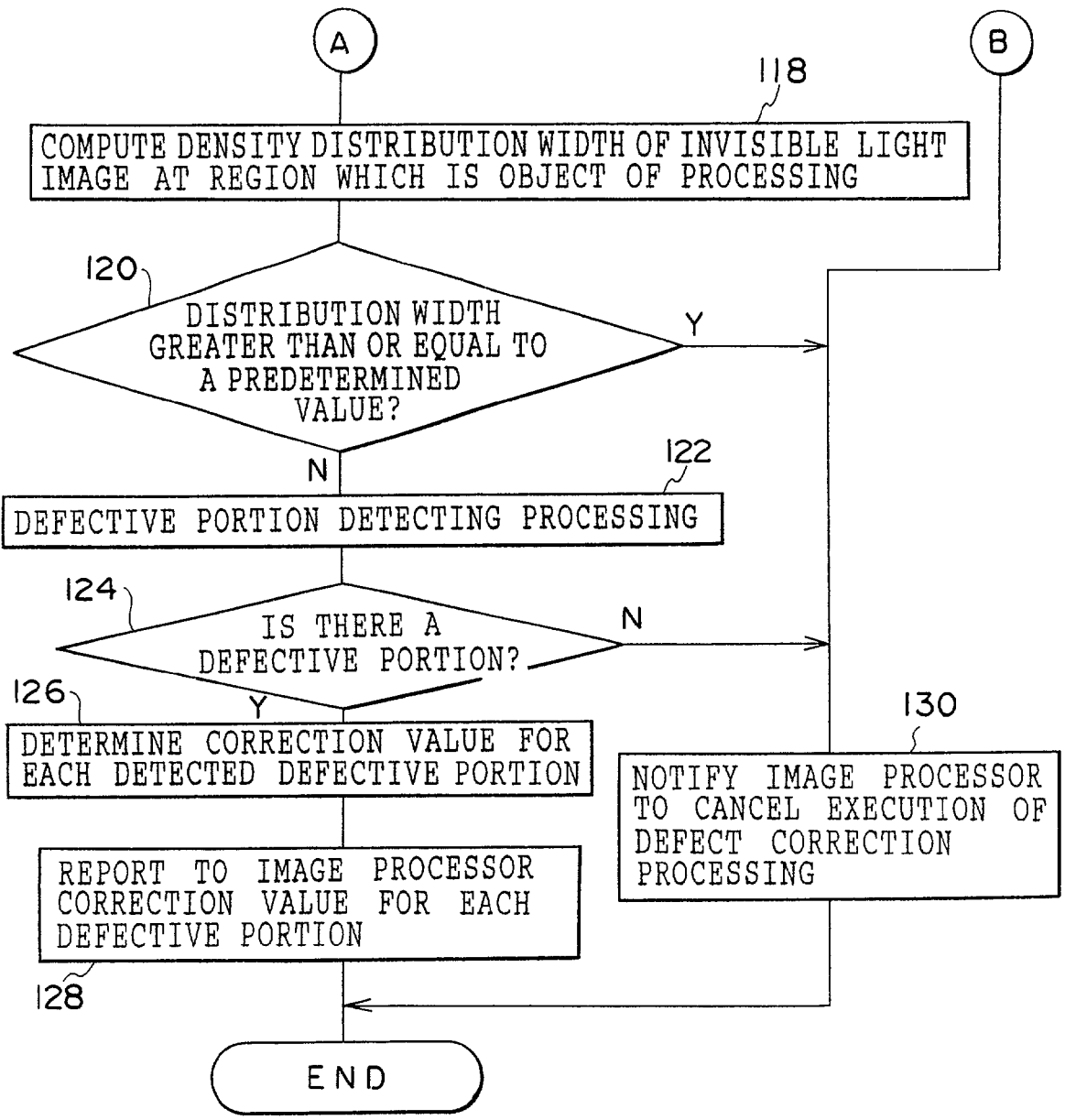

EXAMPLE OF READING RANGE DEFINED
BY NON-IMAGE PORTION

CHANGES IN IR LIGHT TRANSMITTED LIGHT AMOUNT

FIG.5A
INVISIBLE LIGHT IMAGE WITH NO IMAGE-COPY

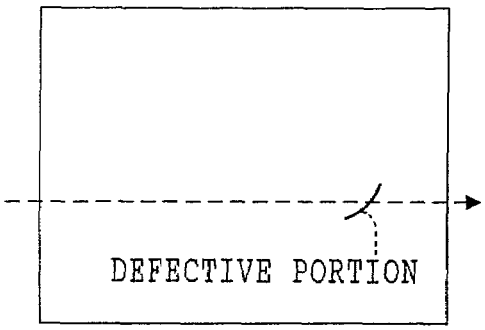

DEFECTIVE PORTION

FIG.5B
INVISIBLE LIGHT IMAGE WITH IMAGE-COPY

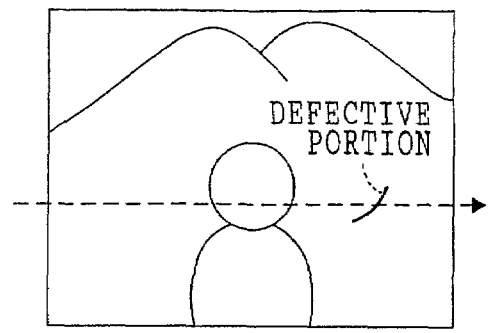

DEFECTIVE PORTION

FIG.5C
CHANGES IN IR LIGHT TRANSMITTED LIGHT AMOUNT OF INVISIBLE LIGHT IMAGE WITHOUT IMAGE-COPY

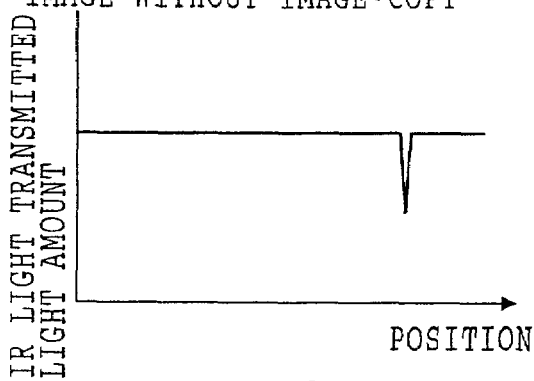

FIG.5D
CHANGES IN IR LIGHT TRANSMITTED LIGHT AMOUNT OF INVISIBLE LIGHT IMAGE WITH IMAGE-COPY

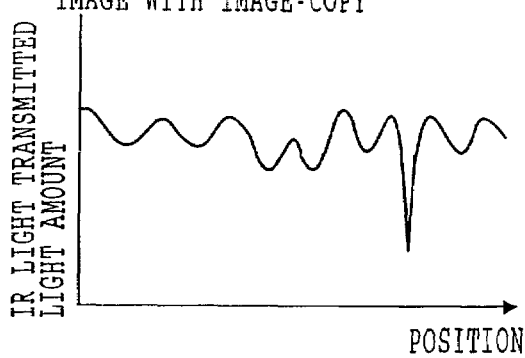

FIG.5E
DENSITY HISTOGRAM OF INVISIBLE LIGHT IMAGE WITHOUT IMAGE-COPY

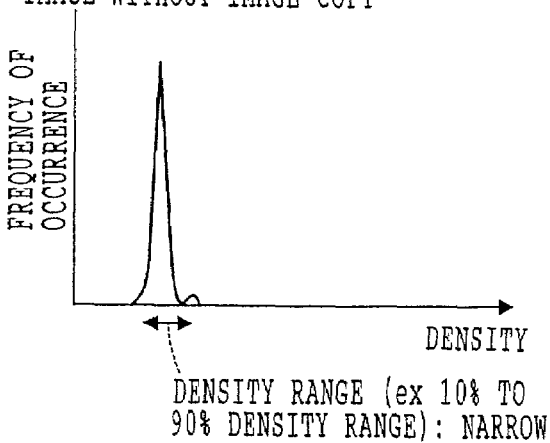

DENSITY RANGE (ex 10% TO 90% DENSITY RANGE): NARROW

FIG.5F
DENSITY HISTOGRAM OF INVISIBLE LIGHT IMAGE WITH IMAGE-COPY

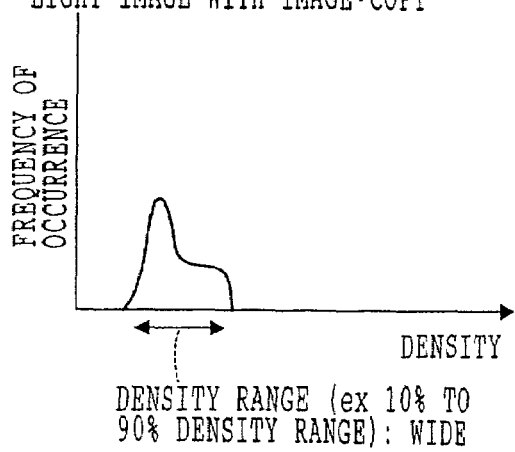

DENSITY RANGE (ex 10% TO 90% DENSITY RANGE): WIDE

TRANSMISSION OF LIGHT AT PHOTOGRAPHIC FILM

CASE IN WHICH SCRATCH IS FORMED IN BACK SURFACE

CASE IN WHICH SCRATCH IS FORMED IN EMULSION SURFACE

CASE IN WHICH SCRATCH IS FORMED IN BACK SURFACE

CASE IN WHICH SCRATCH IS FORMED IN EMULSION SURFACE

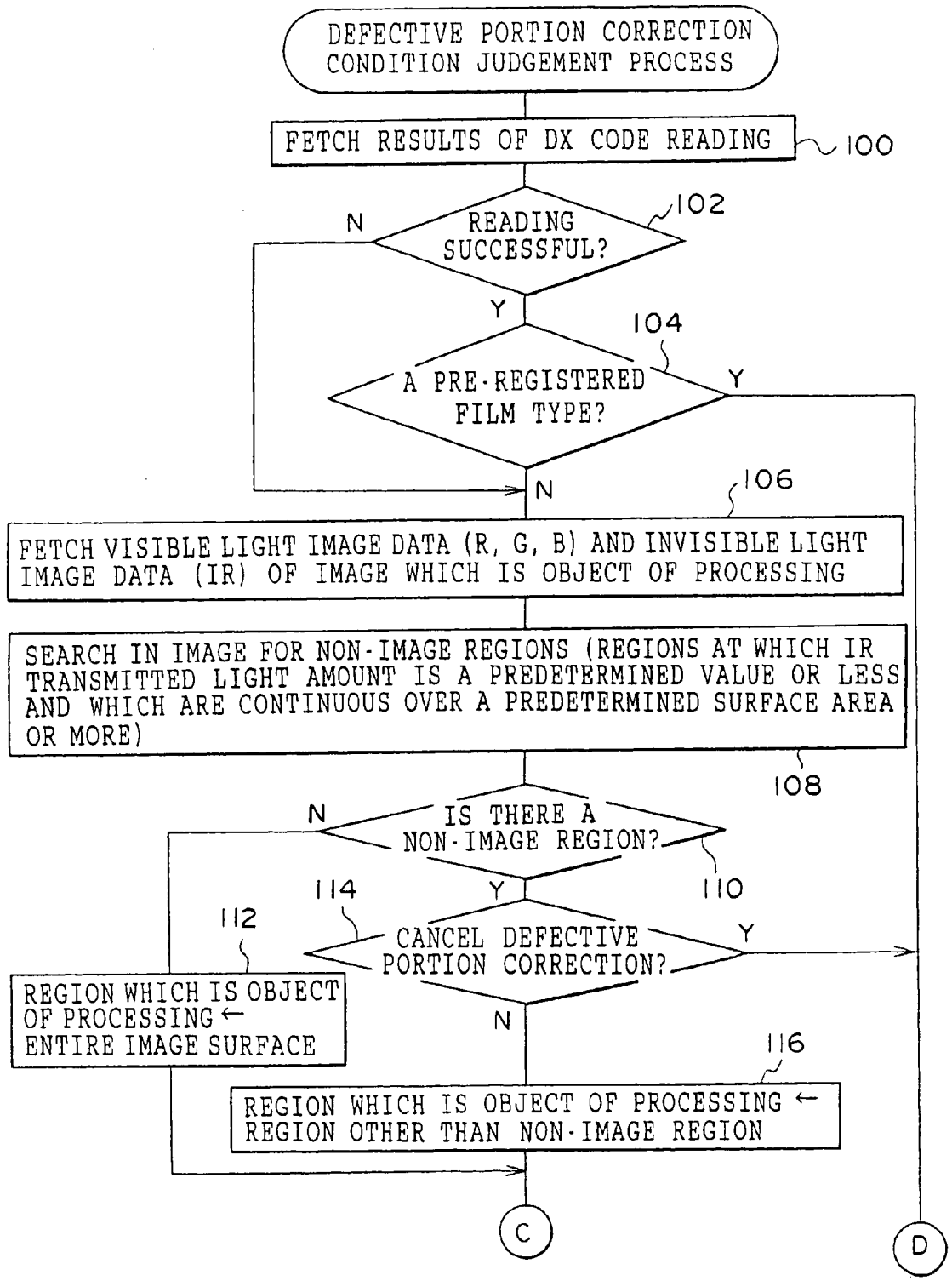

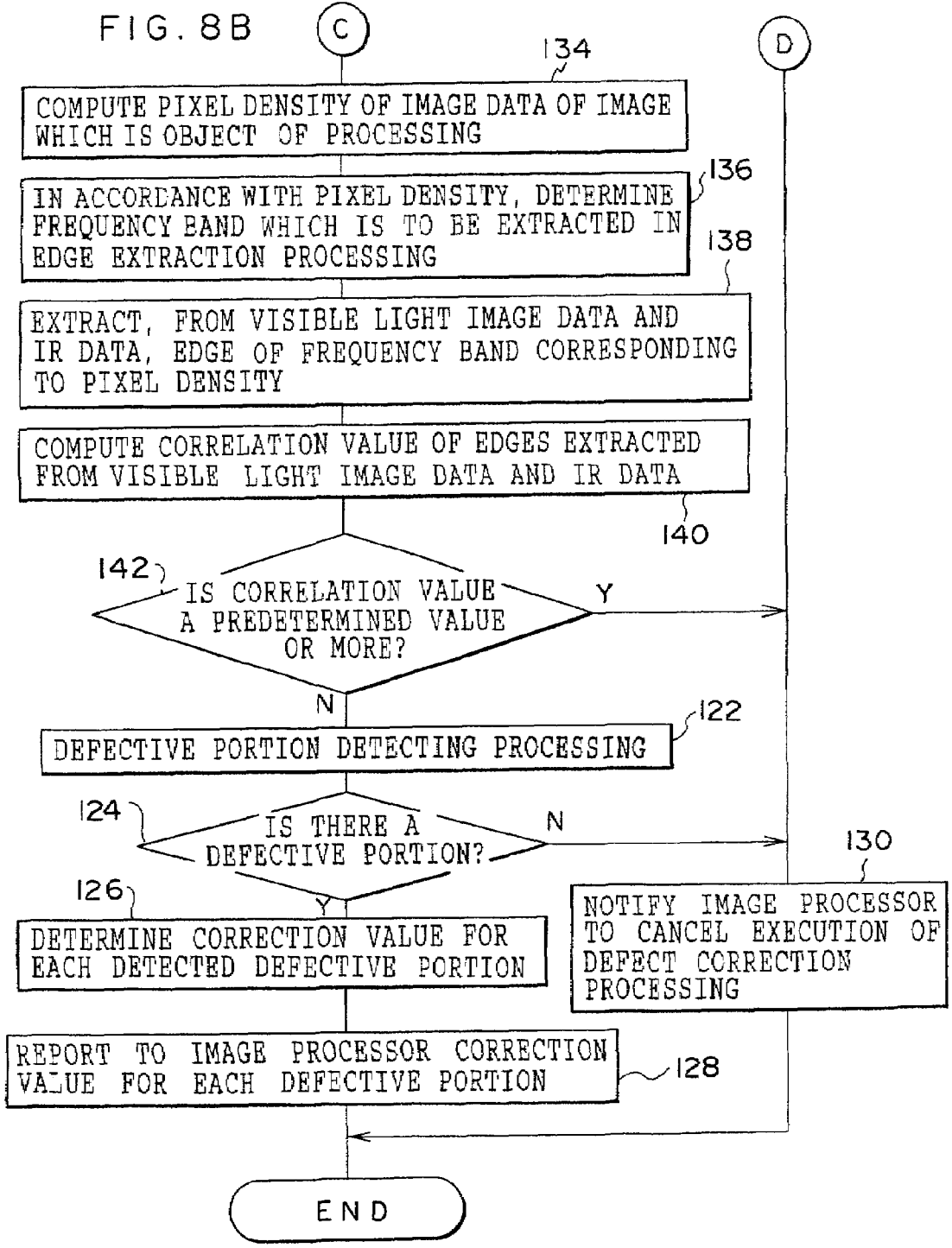

IMAGE PROCESSING DEVICE AND METHOD, AND RECORDING MEDIUM

BACKGROUND OF THE INVENTION

1. Field of the Invention

The present invention relates to an image processing device and method and a recording medium, and in particular, to an image processing device which corrects defective portions within an image as represented by image information, to an image processing method which is applicable to the image processing device, and to a recording medium on which is recorded a program for making a computer function as an image processing device.

2. Description of the Related Art

There are cases in which scratches are formed on an emulsion surface or back surface (the reverse surface from the emulsion surface) of a photographic film due to how the photographic film has been handled. In a case in which a scratch is formed in a place on the photographic film corresponding to an image-recorded region, when the image which is recorded on the photographic film is output (is recorded onto an image recording material such as a photographic printing paper, or is displayed on a display means such as a display), there are many cases in which (although it depends upon the extent of the scratch) the scratch formed in the photographic film is clearly visible on the output image as a defective portion such as a low density streak or a white streak or the like. Further, in cases in which foreign matter such as dust or the like adheres to the surface of the photographic film, the foreign matter is clearly visible as a defective portion.

In a planar exposure type photographic printing device, which irradiates light onto a photographic film and irradiates the light which has passed through the photographic film onto photographic printing paper so as to expose and record the image onto the photographic printing paper, as a countermeasure to scratching of the photographic film, a diffusion plate is disposed between the light source and the photographic film, and the light which is scattered by the diffusion plate is irradiated onto the photographic film. However, with this technique, it is difficult to eliminate the defective portions from the output image (the image which is exposed and recorded on the photographic printing paper), and the defects are merely mitigated slightly (i.e., are merely made to be slightly less noticeable).

A technique which is applicable to image reading devices which are structured to read, by a reading sensor such as a CCD, an image recorded on a photographic film is disclosed in Japanese Patent Application Laid-Open (JP-A) No. 11-75039, which discloses reading a photographic film for at least four wavelength ranges, including three wavelengths in the visible light region and one wavelength in the invisible light region (e.g., the infrared region or the ultraviolet region). On the basis of information obtained by reading in the invisible light region, the image information which is obtained by reading in the visible light region is corrected.

For light in the visible light region, the transmitted light amount varies in accordance with the density of the image recorded on the photographic film. Further, at places where scratches are formed in or foreign matter adheres to the photographic film, the transmitted light amount of the light in the visible light region varies due to light being partially refracted and reflected by the scratches or foreign matter. On the other hand, for light in the invisible light region (invisible light), at the places where scratches have been formed in or foreign matter has adhered to the photographic film, the transmitted light amount varies, but the invisible light is not affected by the density of the image recorded on the photographic film.

Accordingly, in accordance with the technique described in the aforementioned publication, a scratch in or foreign matter on the photographic film can be detected from changes in the transmitted light amount of invisible light, and changes in the transmitted light amount of light in the visible light range that are due to the scratch in or the foreign matter on the photographic film can be corrected. Namely, the defective portions of the image (i.e., of the image as represented by image information obtained by reading in the visible light region), which defective portions are due to a scratch in or foreign matter on the photographic film, can be corrected.

However, among the many types of photographic films which are currently on the market, there are photographic films which are sensitive to invisible light as well, and on which, at the time of exposure and recording of an image, an invisible light image is simultaneously formed (so-called image-copy) in addition to the visible light image. In such a photographic film, the transmitted light amount of invisible light varies in accordance with the density of the image of invisible light. Thus, even if invisible light is used as above, it is difficult to isolate changes in the transmitted light amount which are due to the recorded image, and changes in the transmitted light amount which are due to a scratch or foreign matter. Problems arise in that, by carrying out the above-described defect detection-correction processing, conversely, deterioration in the image quality arises, such as edge portions in the image becoming more dull and the like, and the defect correction processing requires an unsuitably long time.

The aforementioned problems are not limited to cases in which defect detection-correction is carried out at the time of exposing and recording onto a photographic film for images which are formed at the same time as images by invisible light. The same types of problems arise in other cases; for example, in the reading of an image which is recorded on a reversal film which is set in a slide mount, by carrying out reading in a state in which non-image portions, such as the slide mount or the like, are within the reading range, the non-image portions (the portions corresponding to the slide mount) are included in the image represented by the image data which is the object of processing.

SUMMARY OF THE INVENTION

The present invention was developed in light of the aforementioned, and an object of the present invention is to provide an image processing device, an image processing method, and a recording medium which can pre-emptively prevent a deterioration in image quality and can pre-emptively prevent processing from requiring more time than is preferable, due to defect detection-correction processing.

In order to achieve the above-described object, a first aspect of the present invention is an image processing device comprising: detection-correction means for carrying out detection of a defective portion of an image represented by image information and carrying out correction for the defective portion; judgment means for carrying out determination of whether or not the image is suited for detection and correction by the detection-correction means; and control means for controlling the detection-correction means such that if the judgment means determines that the image is not suited for detection and correction by the detection-correction means, then either the detection and correction is cancelled or the detection and correction is performed only for a region of the image other than a region which is determined by the judgment means to be unsuited for the detection and correction.

The first aspect of the present invention is equipped with detection-correction means (the detection-correction logic) for detecting any defective portions of an image represented by image information, and carrying out, on the image information, correction of the detected defective portion. If the image which is the object of defective portion correction is an image which is recorded on an image recording medium (e.g., a photographic film or other medium), the image information can be obtained by, for example, irradiating light onto the image recording medium and photoelectrically converting the visible light which is either transmitted through or reflected by the information recording medium (reading by a photoelectric converting element equipped with a large number of photoelectric conversion cells) into an electrical signal.

In this case, the detection of a defective portion of the image can be carried out by, for example, irradiating invisible light onto the image recording medium, and utilizing the results of photoelectrically converting the invisible light which has been transmitted through or reflected by the image recording medium. The correction of the detected defective portion can be carried out by, for example, determining information for the region of the image corresponding to the defective portion by interpolation from the information of portions at the periphery of the defective portion, or by correcting the image information such that the brightness of the defective portion changes, or by correcting the image information by reducing high frequency components of spatial frequency at the defective portion or adjacent portions, such that the defective portion is blurred.

Moreover, in the first aspect of the present invention, judgment means (the judgment logic) determines whether or not the image is suited to defective portion detection and correction by the detection-correction means (e.g., whether or not the image quality will deteriorate due to the detection-correction processing, or more time than is preferable will be required for the processing or the like). In a case in which it is judged that the image is unsuited to defective portion detection and correction, control means (the control logic) carries out control such that either defective portion detection and correction by the detection-correction means are prohibited, or defective portion detection and correction are carried out only for regions of the image other than regions which have been determined by the judgment means to be unsuited for defective portion detection and correction.

Accordingly, for images which are judged to be unsuited for defective portion detection and correction because, for example, the image quality will deteriorate due to the defect detection-correction processing or more time than is preferable will be required for the processing or the like, either defect detection-correction processing is not carried out, or defect detection-correction processing is carried out only for regions which have been determined to be suited for defective portion detection and correction. Thus, it is possible to pre-emptively prevent a deterioration in image quality arising due to the defect detection-correction processing and the processing requiring more time than is preferable.

In the first aspect, the image information which is the object of processing may be image information obtained by irradiating light onto an image recording medium and photoelectrically converting visible light which has been one of transmitted through and reflected by the information recording medium, and the judgment means carries out determination on the basis of results of irradiating light onto the image recording medium and photoelectrically converting invisible light which has been one of transmitted through and reflected by the information recording medium.

In a case in which the image information which is the object of processing is image information obtained by irradiating light onto the image recording medium and photoelectrically converting visible light which is either transmitted through or reflected by the information recording medium, if an invisible light image is also formed on the image recording medium on which the image to be processed is recorded, it is difficult to accurately extract only the defective portion, and the image can be judged as being unsuited for the defective portion detection and correction. Further, accurate extraction of only defective portions is also difficult in cases such as the following case, for example: the image is recorded on a photographic film which is set in a slide mount. A portion corresponding to the slide mount will also be included in the image which is represented by the image information. For this or other reasons, a non-image portion, at which the transmitted light amount or reflected light of the invisible light is extremely low or extremely high and whose surface area is a predetermined value or greater, exists in the image represented by the image information.

In contrast, the present invention utilizes the fact that in a case in which an invisible light image is formed on the image recording medium or in a case in which a non-image portion exists in the image, the results of photoelectrically converting the invisible light which is transmitted through or reflected by the image recording medium differ greatly from cases other than those mentioned above (i.e., differ greatly from a case in which an invisible light image is not formed on the image recording medium or a case in which no non-image portion exists in the image which is the object of processing). On the basis of results of irradiating light onto the image recording medium and photoelectrically converting the invisible light which is transmitted through or reflected by the image recording medium, it is determined whether or not the image which is the object of processing is suited to defective portion detection and correction. The determination as to whether or not the image which is the object of processing is suited to defective portion detection and correction can be carried out accurately.

At the time of determining whether or not the image is suited to defective portion detection and correction, in a case in which an invisible light image is formed on the image recording medium, the determination as to whether or not the image is suited to defective portion detection and correction can be realized specifically by, for example, carrying out the determination on the basis of a density distribution range of an invisible light image represented by invisible light image information which is obtained by photoelectrically converting the invisible light which has been transmitted through or reflected by the information recording medium. Namely, in a case in which an invisible light image is not formed on the image recording medium, the density of the invisible light image varies only in accordance with defective portions. Therefore, the density distribution range of the invisible light image is narrow. In contrast, in a case in which an invisible light image is formed, the density of the invisible light image varies in accordance with both defective portions and the image by the invisible light. Thus, the density distribution range of the invisible light image is wide.

By utilizing the density distribution range of the invisible light image, if, for example, the density distribution range of the invisible light image is a predetermined value or more, there is a high possibility that an invisible light image is formed on the image recording medium, and it can be judged that the image is not suited for defective portion detection and correction. Thus, the determination as to whether or not the image is suited to defective portion detection and correction can be carried out easily and accurately.

In a case in which an invisible light image is also formed on the image recording medium on which the image to be processed is recorded, the invisible light image exhibits changes in density which are similar to those of the image to be processed (the visible light image). Thus, the determination as to whether or not the image is suited to defective portion detection and correction can be carried out on the basis of a correlation value (a value of a parameter expressing correlation) between the image information and the invisible light image information. In a case in which the correlation value between the invisible light image information and the image information is used, the determination as to whether or not the image is suited to defective portion detection and correction can be carried out accurately.

In a case in which the correlation value of the invisible light image information and the image information is used, in consideration of the fact that there is a possibility that the density of the invisible light image and the density of the image which is the object of processing differ greatly, it is preferable to compute the correlation value between the image information and the invisible light image information for at least one frequency band in a range from an intermediate frequency to a high frequency, and to carry out the determination on the basis of the computed correlation value. In this way, the correlation value is computed by removing DC components of the density of the image (the density offset between the invisible light image represented by the invisible light image information and the image represented by the image information), and low frequency components. Thus, the effect on the correlation value of an overall density difference between the invisible light image and the image which is the object of processing can be made small, and the determination as to whether or not the image is suited to defective portion detection and correction can be carried out simply and accurately.

Whether or not an invisible light image is also formed on the image recording medium on which the image is record can be determined on the basis of whether or not the image recording medium on which the image is recorded is an image recording medium having the characteristic that an invisible light image is formed at the same time that the visible light image is formed. In a case in which the type of the image recording medium on which the image is recorded is detected in accordance with the above, and the detected type of the image recording medium is a type registered in advance, it can be determined that the image is not suited to defective portion detection and correction.

If, for example, the image recording medium is a photographic film, the type of the image recording medium can be detected by reading a DX code recorded on the photographic film or the like. Whether an invisible light image is formed can be determined without using the invisible light image information or the image information. Thus, whether or not the image is suited to defective portion detection and correction may be determined by simple processing in a short time.

Further, in a case in which a region which is fundamentally not an image exists in the image represented by the image information, problems arise such as the defect detection-correction processing requiring more time than is preferable. In such a case, the determination as to whether or not the image is suited to defective portion detection and correction is preferably carried out, on the basis of the results of photoelectrically converting the invisible light which has been transmitted through or reflected by the information recording medium, whether there exists in the image represented by the image information a region (a non-image portion) at which the transmitted light amount or the reflected light amount of the invisible light is extremely low or extremely high and whose surface area is greater than or equal to a predetermined value. Further, it is preferable that the control means effects control such that defective portion detection and correction are carried out only on regions other than the non-image portion of the image which is the object of processing. In this way, if there is a defective portion in a region corresponding to the image (the region other than the non-image portion), the defective portion can be detected and corrected without a deterioration in image quality and without processing requiring more time than is preferable, due to the defect detection-correction processing.

A second aspect of the present invention is a method for processing an image represented by image information, the method comprising the steps of: determining whether or not the image is suited for defect detection and correction; if the image is suited for defect detection and correction, detecting defective portions of the image, and carrying out correction for the defective portions; and if the image is not suited for defect detection and correction, then carrying out one of: cancelling defect detection and correction, and detecting a region of the image which region is unsuited for defect detection and correction, detecting defective portions in a region of the image other than the region unsuited for defect detection and correction, and carrying out correction for the defective portions. Thus, in the same way as in the first aspect of the present invention, it is possible to pre-emptively prevent a deterioration in image quality from arising and the processing requiring more time than is preferable due to the defect detection-correction processing.

A third aspect of the present invention is a recording medium on which are recorded instructions readable by a computer for enabling the computer to execute an image processing process, the process comprising: determining whether or not the image is suited for defect detection and correction; if the image is suited for defect detection and correction, instructing detection of defective portions of the image and performance of correction for the defective portions; and if the image is not suited for defect detection and correction, then carrying out one of: proscribing defect detection and correction and instructing detection of a region of the image which region is unsuited for defect detection and correction, detection of defective portions of a region of the image other than the region unsuited for defect detection and correction, and performance of correction for the defective portions.

On the recording medium of the third aspect of the present invention is recorded a program for realizing, at a computer, processings including the above-described steps, i.e., the image processing method of the second aspect of the present invention. Thus, by a computer reading and executing the program recorded on the recording medium, in the same way as in the first and second aspects of the present invention, it is possible to pre-emptively prevent a deterioration in image quality from arising and the processing requiring more time than is preferable due to the defect detection-correction processing.

BRIEF DESCRIPTION OF THE DRAWINGS

FIGS. 3A and 3B are flowcharts showing details of a defective portion correction condition judgment process relating to a first embodiment of the present invention.

FIGS. 5A and 5B are image diagrams showing examples of an invisible light image without an image copy and an invisible light image with an image copy.

FIGS. 5C through 5F are graphs showing respective examples of changes in the transmitted light amount of IR light and density histograms for the two images.

FIGS. 8A and 8B are flowcharts showing details of a defective portion correction condition judgment process relating to a second embodiment of the present invention.

DESCRIPTION OF THE PREFERRED EMBODIMENTS

Hereinafter, embodiments of the present invention will be described in detail with reference to the drawings.

First Embodiment

Figure 1:
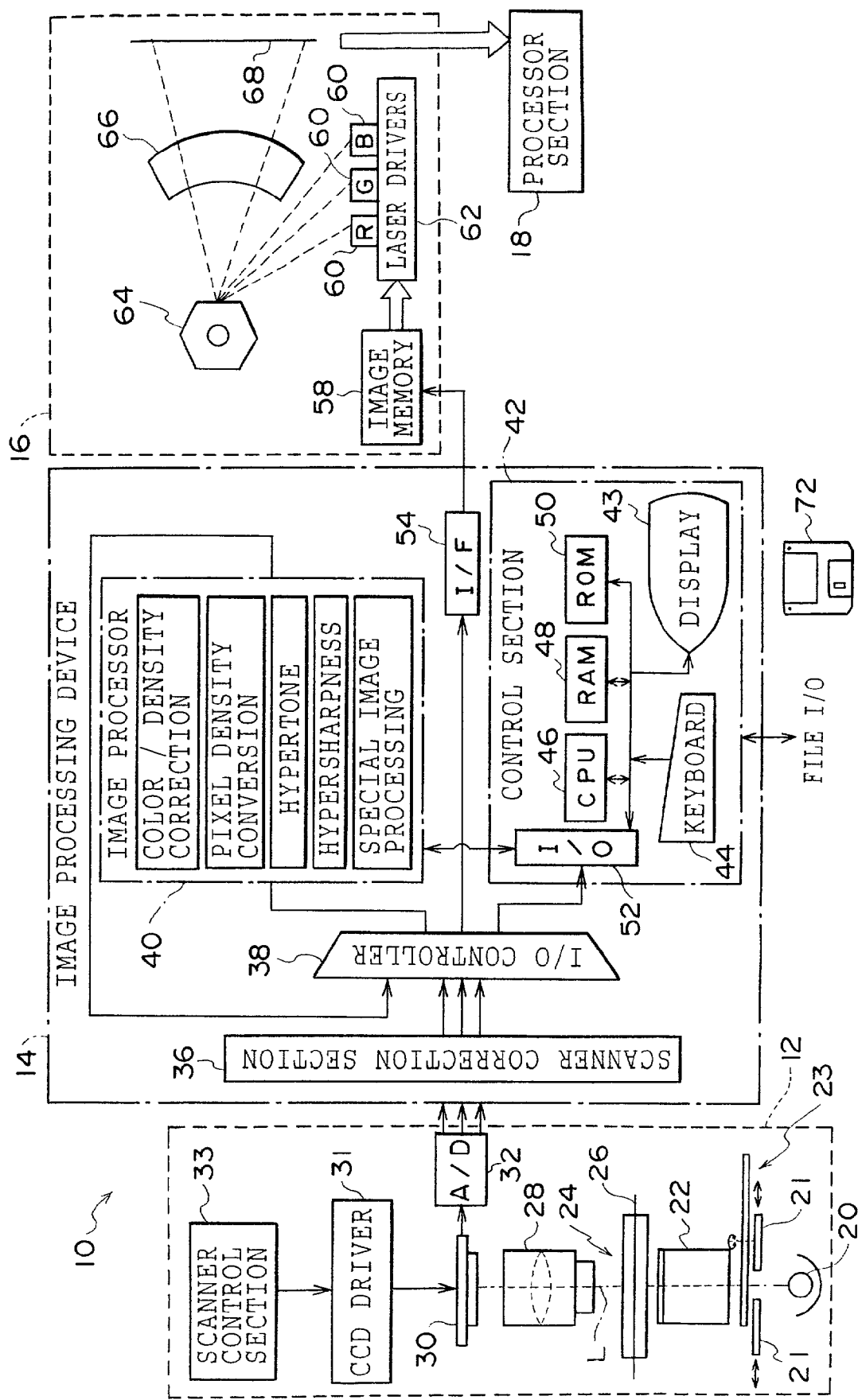
FIG. 1 is a schematic structural view of an image processing system relating to an embodiment of the present invention.

An image processing system 10 relating to the present invention is shown in FIG. 1. The image processing system 10 is formed by a film scanner 12, an image processing device 14 (e.g., a computer system) and a printer 16 connected in series. The film scanner 12 and the image processing device 14 correspond to the image processing device relating to the present invention.

Figure 2:
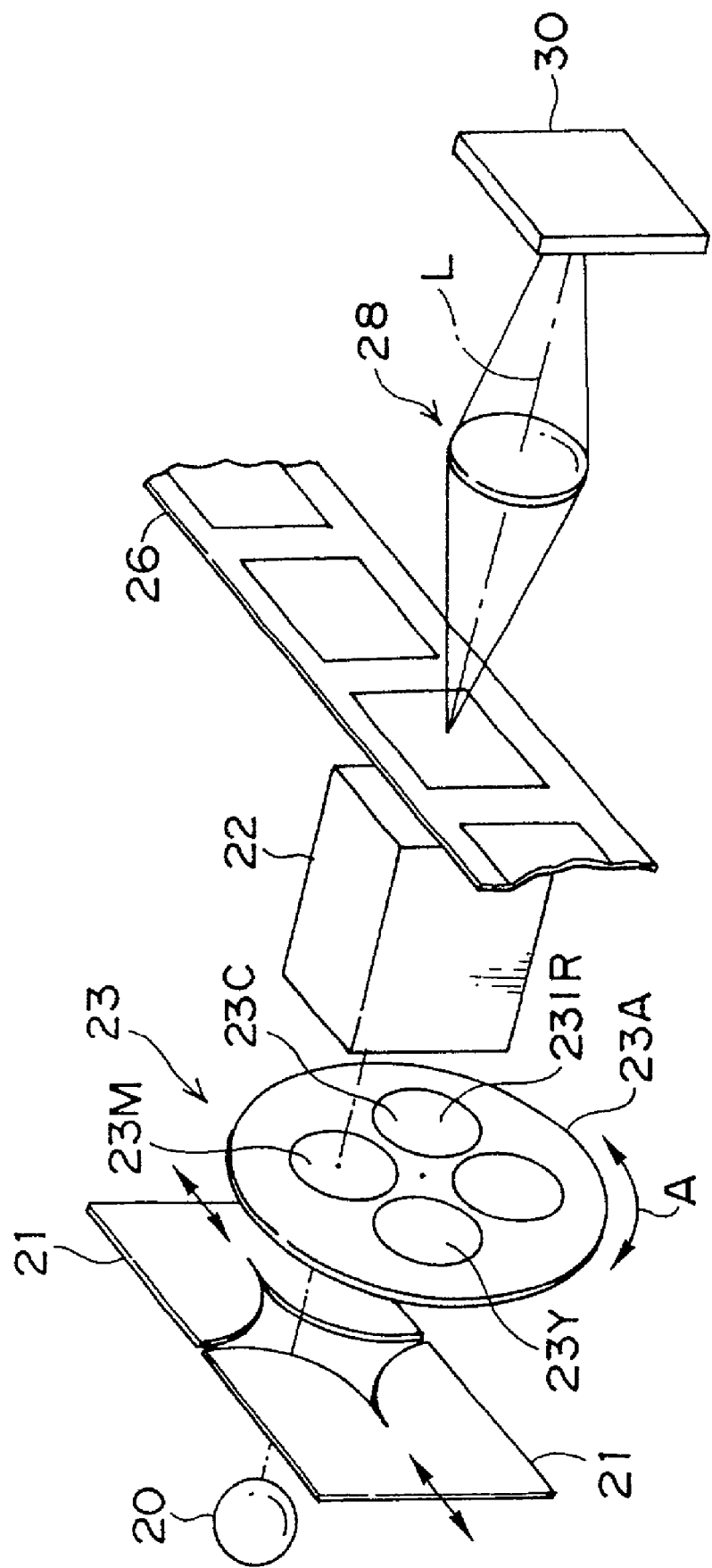
FIG. 2 is a perspective view showing a schematic structure of a film scanner.

The film scanner 12 reads an image (a negative image or a positive image which is made visible by being subjected to developing processing after being used to photograph a subject) which is recorded on a photographic photosensitive material (hereinafter, simply called "photographic film") such as a photographic film (e.g., a negative film or a reversal film) or the like. The film scanner 12 outputs image data obtained by the reading. As shown in FIG. 2 as well, the film scanner 12 is equipped with a light source 20 which is formed of a halogen lamp or the like and irradiates light onto a photographic film 26. Note that the light which is emitted from the light source includes both light of wavelengths in the visible light region and light of wavelengths in the infrared region.

An aperture 21 for adjusting the light amount of the light irradiated onto the photographic film 26, a filter unit 23, and a light diffusing box 22 which makes the light irradiated onto the photographic film 26 diffuse light, are disposed in that order at a light emission side of the light source 20. The filter unit 23 is formed by four filters fit into a turret 23A which is rotatable along the directions of arrow A in FIG. 2. The four filters are a filter 23C which allows passage of, among the incident light, only light of a wavelength region corresponding to red (R light); a filter 23M which allows passage of, among the incident light, only light of a wavelength region corresponding to green (G light); a filter 23Y which allows passage of, among the incident light, only light of a wavelength region corresponding to blue (B light); and a filter 23IR which allows passage of, among the incident light, only light of the infrared region (IR light).

An image-forming lens (zoom lens) 28 which images the light which has passed through the photographic film 26, and an area CCD 30 are disposed in that order along an optical axis L at the side of the photographic film 26 opposite the side at which the light source 20 is disposed. The area CCD 30 is a monochromatic CCD which is formed with a large number of CCD cells, which are sensitive to the visible light region and the infrared light region, arranged in a matrix. A light-receiving surface of the area CCD 30 is disposed so as to substantially coincide with the image-forming point position of the image-forming lens 28. Further, a shutter (not shown) is disposed between the area CCD 30 and the image-forming lens 28.

The area CCD 30 is connected to a scanner control section 33 via a CCD driver 31. The scanner control section 33 is equipped with a CPU, a ROM (e.g., a ROM whose stored contents are rewritable), a RAM, and an input/output port, and is formed by these respective components being connected to one another via a bus or the like. The scanner control section 33 controls the operations of the respective portions of the film scanner 12. Further, the CCD driver 31 generates a driving signal for driving the area CCD 30, and controls the driving of the area CCD 30.

The photographic film 26 is conveyed by a film carrier 24 (refer to FIG. 1; not illustrated in FIG. 2) such that the center of an image surface of an image is positioned at a position which coincides with the optical axis L (a reading position). Note that an unillustrated DX code sensor is built-in in the film carrier 24. While the photographic film 26 is being conveyed, the DX code sensor reads a DX code which is recorded on the photographic film 26. Further, in a state in which an image is positioned at the reading position, the scanner control section 33 drives and rotates the turret 23A of the filter unit 23 such that all of the filters including the filter 23IR are positioned successively on the optical axis L. Further, the scanner control section 33 sets, at the CCD driver 31, a charge accumulating time of the area CCD 30 which time depends on predetermined reading conditions. The scanner control section 33 moves the aperture 21 to a position corresponding to the predetermined reading conditions, and adjusts optical magnification (zoom magnification) of the image-forming lens 28 to a predetermined magnification in accordance with the predetermined reading conditions.

In this way, the lights of the wavelengths (R, G, B and IR) corresponding to the respective filters are successively irradiated onto the image-recorded region of the photographic film 26. The light which passes through the image-recorded region on the photographic film 26 is made incident on the area CCD 30 via the image-forming lens 28, is photoelectrically converted by the area CCD 30, and is output from the area CCD 30 as a signal expressing the transmitted light amount. The signal output from the area CCD 30 is converted by an A/D converter 32 into digital data expressing the transmitted light amount, and the digital data is input to the image processing device 14.

The transmitted light amounts of the lights of the respective wavelength regions R, G, B vary in accordance with the R, G, B densities of the image recorded in the image-recorded region. (If a scratch is formed in or foreign matter has adhered to the photographic film 26, the transmitted light amounts of the R, G, B wavelength regions vary due to the scratch or foreign matter, but the transmitted light amount of the IR light is not affected by the image density, and only varies due to scratches or foreign matter or the like.) Accordingly, photoelectrically converting the transmitted lights of the respective wavelength regions R, G, B is suitable for reading the image. Hereinafter, among the data of the respective wavelength regions R, G, B, IR which are input to the image processing device 14, the data other than the IR data, i.e., the respective data of R, G, B, will be called image data. Note that the R, G, B image data corresponds to the image information relating to the present invention, and the IR data corresponds to the invisible light image information.

A scanner correcting section 36 of the image processing device 14 successively carries out various types of correcting processings, such as dark correction, density conversion, shading correction, and the like, on the input image data (and the IR data). Output terminals of the scanner correcting section 36 are connected to input terminals of an I/O controller 38. The image data which has undergone the respective processings at the scanner correcting section 36 is input to the I/O controller 38. The input terminals of the I/O controller 38 are also connected to a data output terminal of an image processor 40. Image data which has undergone image processing (to be described in detail later) is input from the image processor 40.

The input terminals of the I/O controller 38 are also connected to a control section 42. The control section 42 is equipped with an expansion slot (not shown). Drivers (not shown) and communication control devices are connected to the expansion slot. The drivers carry out reading and writing of data (or programs) from and onto card-like storage media, such as a smart media or compact flash, which can be loaded into a digital still camera (hereinafter, such media will be collectively called digital camera cards), and from and onto information storing media such as CD-ROMs, MOs, CD-Rs, and the like. The communication control devices carry out communications with other information processing devices. The image data which is input from the exterior via the expansion slot is input to the I/O controller 38.

Output terminals of the I/O controller 38 are connected to a data input terminal of the image processor 40 and to the control section 42, and, via an I/F circuit 54, to the printer 16. The I/O controller 38 selectively outputs the input data to the devices connected to the output terminals thereof.

In the present embodiment, each of the images recorded on the photographic film 26 is read at the film scanner 12 twice, each time at a different resolution. In the first reading (prescanning), even if the density of the images is extremely low, reading of the images is carried out under reading conditions which are determined such that saturation of accumulated charges at the area CCD 30 does not occur. Note that, in the present embodiment, IR reading is not carried out at the time of prescanning. The data obtained by prescanning (prescan image data) is input to the control section 42 from the I/O controller 38.

The control section 42 is equipped with a CPU 46, a RAM 48, a ROM 50 (e.g., a ROM whose stored contents are rewritable), and an input/output port 52, and is formed by these components being connected to one another via a bus. On the basis of the prescan image data input from the I/O controller 38, the control section 42 determines the size of the image (the aspect ratio), computes an image characteristic amount such as the density of the image or the like, for each image, determines the reading conditions for the time that the film scanner 12 carries out reading again (fine scanning), and outputs the determined reading conditions to the film scanner 12.

A reading magnification (optical magnification) of the image is included in the reading conditions. The reading magnification is determined on the basis of the aspect ratio of the image and the like. For example, among images which are recorded on a 135 size photographic film, for images whose aspect ratios correspond to high vision size or panorama size, the frame size is small, but the recording size of the image onto photographic printing paper is larger than that of a regular full size image. Thus, in consideration of a deterioration in image quality at the time of recording onto photographic printing paper, a reading magnification which is higher than that of a regular size (e.g., a magnification at which the reading resolution (pixel density) is two times greater) is set.

On the basis of the prescan image data, the control section 42 caries out computation of the image characteristic amounts, including extraction of a main image region within the image (e.g., a region corresponding to the face of a person (a face region)). The control section 42 automatically determines by computation (set-up computation) the processing conditions of the various types of image processings on the image data (fine scan image data) to be obtained by the film scanner 12 carrying out fine scanning, and outputs the determined processing conditions to the image processor 40.

For example, in pixel density conversion processing (so-called electronic magnification changing processing) which is one of the various types of image processings, the electronically changed magnification (pixel density conversion rate=pixel density after conversion/pixel density before conversion), which is a processing condition of pixel density conversion processing, is determined by computation on the basis of the reading resolution in the image reading (which is determined from the optical magnification at the time of image reading and the number of cells of the area CCD 30) and the number of pixels of the image data for output (which is determined in accordance with an application of the output image data (e.g., recording onto photographic printing paper, display on a display means, storage onto an information storage medium or the like)).

The control section 42 has a function which, on the basis of the IR data input from the film scanner 12, searches whether or not there are, in the image which is represented by the image data, defective portions caused by a scratch being formed in or foreign matter such as dust adhering to the photographic film 26, and a function for setting parameters for carrying out defect correction processing at the image processor 40. Further, a display 43, a keyboard 44 and a mouse (not shown) are connected to the bus of the control section 42.

On the basis of the computed processing conditions for image processing, the control section 42 subjects the prescan image data to image processing which is equivalent to the image processing to be carried out at the image processor 40 on the fine scan image data, so as to generate simulation image data. The generated simulation image data is converted into a signal for displaying an image on the display 43, and on the basis of this signal, a simulation image is displayed on the display 43. Further, when the operator inspects the image quality and the like of the displayed simulation image and inputs, via the keyboard 44 or the mouse and as the results of inspection, information instructing correction of the processing conditions, the processing conditions of the image processing are recomputed or the like on the basis of the input information.

Image data which is input to the I/O controller 38 by fine scanning being carried out on the image at the film scanner 12 (i.e., the fine scan image data) is input to the image processor 40 from the I/O controller 38. Note that this fine scanning is carried out when the charge accumulating time of the area CCD 30, the position of the aperture 21, and the optical magnification of the image-forming lens 28 are adjusted in accordance with the reading conditions computed previously by the control section 42.

The image processor 40 is equipped with image processing circuits which carry out various types of image processings such as color/density correcting processing which includes gradation conversion and color conversion, pixel density conversion processing (so-called electronic magnification changing processing), hypertone processing which compresses the gradation of the ultra-low frequency brightness components of the image, hypersharpness processing which enhances the sharpness while suppressing graininess, and the like. The image processor 40 carries out the various image processings on the input image data in accordance with the processing conditions which have been determined and reported for each image by the control section 42. Further, the image processor 40 has a function of carrying out defect correction processing in accordance with parameters set by the control section 42.

In a case in which the image data which has been subjected to image processing at the image processor 40 is to be used in recording the image onto photographic printing paper, the image data which has been subjected to image processing at the image processor 40 is output from the I/O controller 38 via the I/F circuit 54 to the printer 16 as image data for recording. Further, in a case in which the image data which has been subjected to image processing is to be output to the exterior as an image file, the image data is output from the I/O controller 38 to the control section 42. Hence, at the control section 42, the image data, which is input from the I/O controller 38 for output to the exterior, is output to the exterior (to the aforementioned driver or communication control device or the like) as an image file via the expansion slot.

The printer 16 is equipped with an image memory 58, R, G, B laser light sources 60, and a laser driver 62 which controls operation of the laser light sources 60. The image data for recording which is input from the image processing device 14 is, after being temporarily stored in the image memory 58, read out and used to modulate the R, G, B laser lights emitted from the laser light sources 60. The laser lights emitted from the laser light sources 60 are scanned onto photographic printing paper 68 via a polygon mirror 64 and an fθ lens 66, such that an image is exposed and recorded on the photographic printing paper 68. The photographic printing paper 68 on which the image has been exposed and recorded is sent into a processor section 18 where it is subjected to respective processings of color developing, bleaching fixing, washing and drying. In this way, the image which is exposed and recorded on the photographic printing paper 68 is made visible.

Next, a defective portion correction condition judgment process will be described as the operation of the present embodiment. The defective portion correction condition judgment process is carried out at the control section 42 after the fine scan image data has been input from the scanner 12 to the image processing device 14 and processing such as pixel density conversion and the like have been carried out on the image data at the image processor 40.

The defective portion correction condition judgment process may be a software process to which the image processing method of the second aspect is applied. The defective portion correction condition judgment process is realized by a defective portion correction condition judgment program being executed by the CPU 46 of the control section 42. The defective portion correction condition judgment program is initially stored in an information storage medium 72 (see FIG. 1) together with programs for executing other processings at the CPU 46. Note that the information storage medium 72 is shown as a floppy disk in FIG. 1, but may be a CD-ROM or a memory card or the like.

The information storage medium 72 is loaded in an information reading device (not shown) which is connected to the control section 42. When transfer (installation) of the program from the information storage medium 72 to the image processing device 14 is instructed, the defective portion correction condition judgment program and the like are read out from the information storage medium 72 by the information reading device, and are stored in the ROM 50 whose stored contents are rewritable. Then, when the time arrives to execute the defective portion correction condition judgment process, the defective portion correction condition judgment program is read from the ROM 50 and the CPU 46 executes this program. In this way, the image processing device 14 functions as the image processing device of the present invention. The information storage medium 72, which stores the defective portion correction condition judgment program and the like, corresponds to a recording medium of the present invention.

Figure 3A:
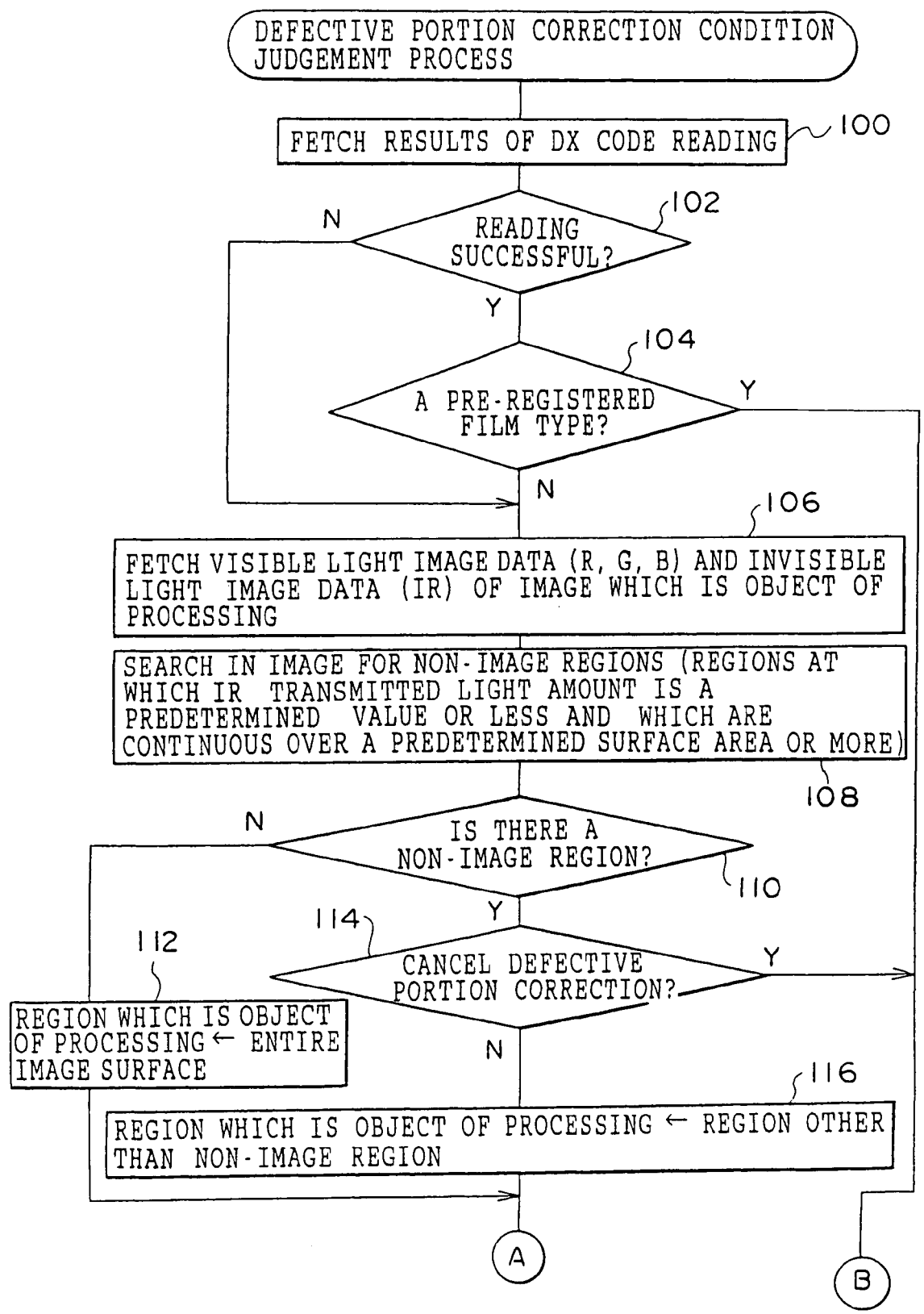

Next, the defective portion correction condition judgment process will be described with reference to the flowchart of FIG. 3. The defective portion correction condition judgment process is carried out on each image for which execution of the defect correction processing has been specified at the image processor 40, with a single image being used as the object of processing each time. In step 100, when the film carrier 24 conveys the portion of the photographic film 26 which is the object of processing, on which the image which is the object of processing is recorded, the results of the DX code sensor which is built into the film carrier 24 reading the DX code recorded at both side portions of the photographic film 26 portion which is the object of processing, are fetched.

There are cases in which the reading of the DX code by the DX code sensor cannot be carried out normally due to, for example, the film which is the object of processing being a reversal film which is set at a slide mount, or due to other reasons. Thus, in subsequent step 102, a determination is made as to whether reading of the DX code has been successful. If the answer to the determination is affirmative, the routine moves on to step 104, where the film type of the photographic film 26 which is the object of processing is recognized on the basis of the results of reading the DX code that were fetched in step 100. Further, a determination is made as to whether the film type of the photographic film 26 which is the object of processing is or is not a film type which has been registered in advance in a register.

In the present embodiment, registered in advance in the ROM 50 or the like are film types of films which, among the many types of films which are currently available on the market as photographic films, are known in advance to be sensitive to the infrared region as well, and to have the characteristic that, at the time of exposure and recording of an image, in addition to a visible light image, an invisible IR image is formed simultaneously. Accordingly, in a case in which the answer to the determination in step 104 is affirmative, it can be judged that, in addition to a visible light image, an IR image is also formed on the photographic film 26 portion which is the object of processing, and that it will be difficult to accurately and in a short time carry out automatic detection and correction of defective portions of the image which is the object of processing. Hence, the routine moves on to step 130 where the image processor 40 is notified that execution of defect correction processing on the image which is the object of processing is prohibited, and thereafter the defective portion correction condition judgment process is ended. Note that the above-described steps 100 and 102 correspond to the judgment means of the present invention, and that step 130 corresponds to control means of the present invention.

On the other hand, when the answer to the determination in step 104 is negative, the routine moves on to step 106. Further, in a case in which the determination in step 102 is negative due to failure to read a DX code, it is difficult to determine, on the basis of the film type, whether or not an IR image is formed on the photographic film 26 which is the object of processing. Thus, in the same way as described above, the routine proceeds to step 106.

In step 106, the visible light image data (R, G, B data) and the invisible light image data (IR data) of the image which is the object of processing are fetched by the RAM 48 or the like. In step 108, a search is conducted as to whether there exists, on the invisible light image represented by the invisible light image data fetched in step 106, a region (a non-image region) where a portion at which the transmitted light amount of IR light is a predetermined value or less is continuous over a predetermined surface area or more. Then, in step 110, on the basis of the results of searching in step 108, it is judged whether a non-image region exists in the invisible light image. Note that above-described steps 106 and 108 correspond to judgment means of the present invention.

Figure 4A:
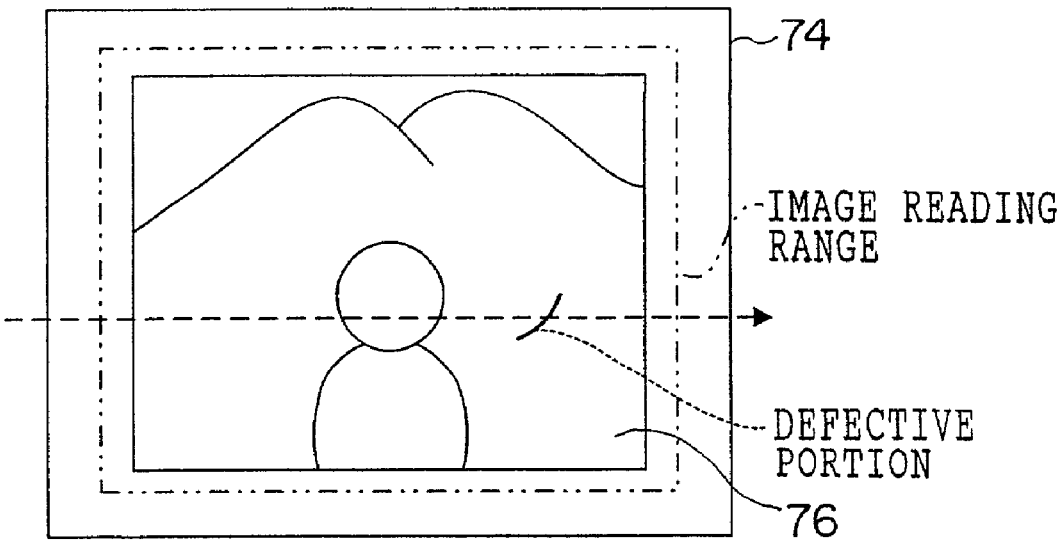
FIG. 4A is an image diagram showing an example of a reading range which is defined by a non-image portion.
Figure 4B:
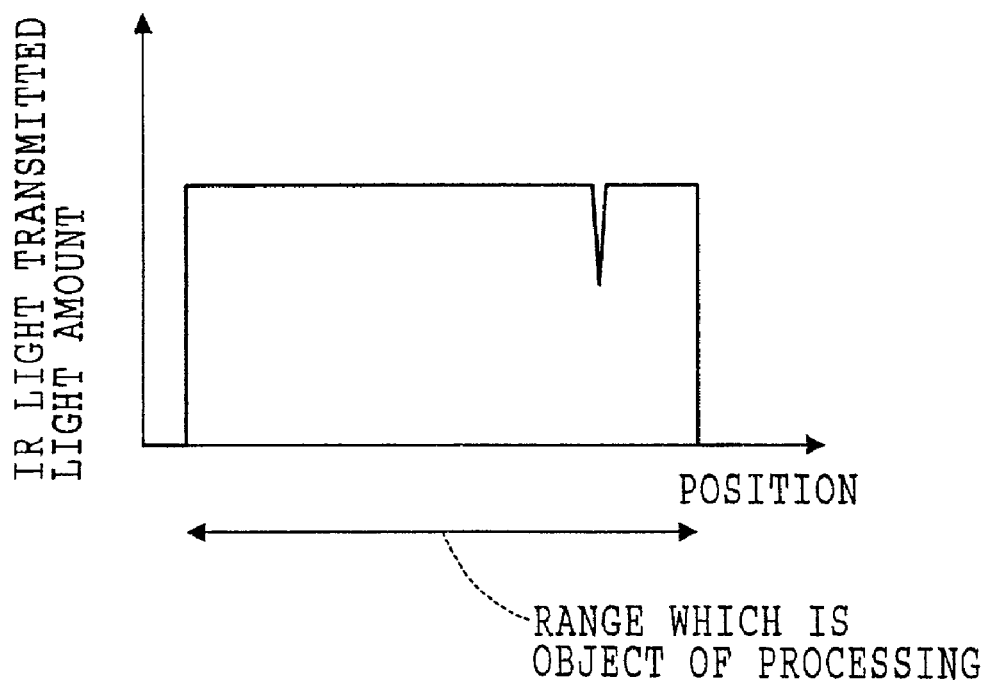
FIG. 4B is a graph showing an example of changes in a transmitted light amount of IR light in the reading range of FIG. 4A.

As an example, as shown in FIG. 4A, the photographic film 26 which is the object of processing is a reversal film 76 which is set in a slide mount 74. As shown by the imaginary line in the figure, in a case in which a range which includes a portion of the slide mount 74 is read by the film scanner 12, at the portion, within the reading range, which portion corresponds to the slide mount 74, the transmitted light amount of IR light (and visible light) is extremely low. (As an example, refer to FIG. 4B which shows the changes in the transmitted light amount of IR light at predetermined positions (the positions along the broken line arrow) of the image of FIG. 4A.) Thus, a portion in the invisible light image which corresponds to the slide mount 74 is recognized as a non-image region.

In a case in which no non-image region exists in the invisible light image, the answer to the determination in step 110 is negative, and the routine moves on to step 112. The entire surface of the image (the visible light image represented by the visible light image data and the invisible light image represented by the invisible light image data) is set as the region which is the object of processing. Thereafter, the routine moves on to step 118. On the other hand, in a case in which a non-image region exists in the invisible light image, the answer to the determination in step 110 is affirmative, and the routine moves on to step 114 where it is judged whether automatic detection and correction of defective portions of the image which is the object of processing are to be cancelled.

In a case in which automatic detection and correction of defective portions are carried out on an image which includes a non-image portion, problems arise such as an unnecessarily long amount of time being required for processing due to the non-image portion being mistakenly detected as a defective portion, or the like. Thus, in the present embodiment, for an image which includes a non-image region, the operator can select in advance via the keyboard 44 or the like whether automatic detection and correction of defective portions are to be cancelled, or whether automatic detection and correction of defective portions are to be carried out only on regions other than the non-image regions. In step 114, by referring to the results of selection of the operator, which are stored in the RAM 48 or the like, it is judged whether or not to cancel the defective portion automatic detection and correction.

If the answer to the determination in step 114 is affirmative, the routine moves on to step 130. Cancellation of execution of the defect correction processing on the image which is the object of processing is notified to the image processor 40, and thereafter the defective portion correction condition judgment process is ended. However, if the answer to the judgment in step 114 is negative, the routine moves on to step 116. A region (see FIG. 4B as well) which is obtained by removing the non-image region from the image which is the object of processing is set as the region which is the object of processing, and thereafter the routine moves on to step 118. Above steps 114 and 116 correspond to the control means of the present invention.

In step 118, a density distribution width of the invisible light image in the region which is the object of processing as set in step 112 or step 116 is calculated. In subsequent step 120, a determination is made as to whether the density distribution width of the invisible light image is greater than or equal to a predetermined value. Note that steps 118 and 120 correspond to the judgment means of the present invention. In a case in which the photographic film 26 which is the object of processing is, as shown as an example in FIG. 5A, a usual photographic film on which no IR image is formed at the time of exposing and recording the image (i.e., a photographic film without JR image-copy), the transmitted light amount of the JR light varies mainly in accordance with the defective portion as shown as an example in FIG. 5C. Thus, the density distribution width of the invisible light image is relatively narrow as shown as an example in FIG. 5E. the judgement means of the present invention. In a case in which the photographic film 26 which is the object of processing is, as shown as an example in FIG. 5A, a usual photographic film on which no IR image is formed at the time of exposing and recording the image (i.e., a photographic film without IR image-copy), the transmitted light amount of the IR light varies mainly in accordance with the defective portion as shown as an example in FIG. 5C. Thus, the density distribution width of the invisible light image is relatively narrow as shown as an example in FIG. 5E.

In contrast, when the photographic film 26 which is the object of processing is, as shown as an example in FIG. 5B, a photographic film on which an IR image is formed at the time of exposing and recording the image (i.e., a photographic film having IR image-copy), the transmitted light amount of the IR light varies in accordance with the IR image and the defective portion as shown as an example in FIG. 5D. Thus, the density distribution width of the invisible light image is relatively broad as shown in FIG. 5F for example. Accordingly, by steps 118 and 120, it can be accurately judged whether or not an IR image is formed on the photographic film 26 which is the object of processing, i.e., whether or not the image which is the object of processing is suited to defective portion detection and correction.

If the answer to the determination in step 120 is affirmative, in addition to the visible light image, an IR image is also formed on the photographic film 26 which is the object of processing, and it can be judged that it will be difficult to accurately and in a short time carry out automatic detection and correction of defective portions on the image which is the object of processing. Thus, in step 130, cancellation of execution of the defect correction processing on the image which is the object of processing is notified to the image processor 40, and the defective portion correction condition judgment process is ended.

On the other hand, if the answer to the determination in step 120 is negative, it can be judged that no IR image is formed on the photographic film 26 which is the object of processing. Thus, the routine moves on to step 122 where defective portion detecting processing, which detects defective portions in the region which is the object of processing of the image which is the object of processing, is carried out. First, before the defective portion detecting processing is explained, an explanation will be given of the principles of detection, by IR light, of places where scratches have been formed in or foreign matter has adhered to a photographic film.

Figure 6A:
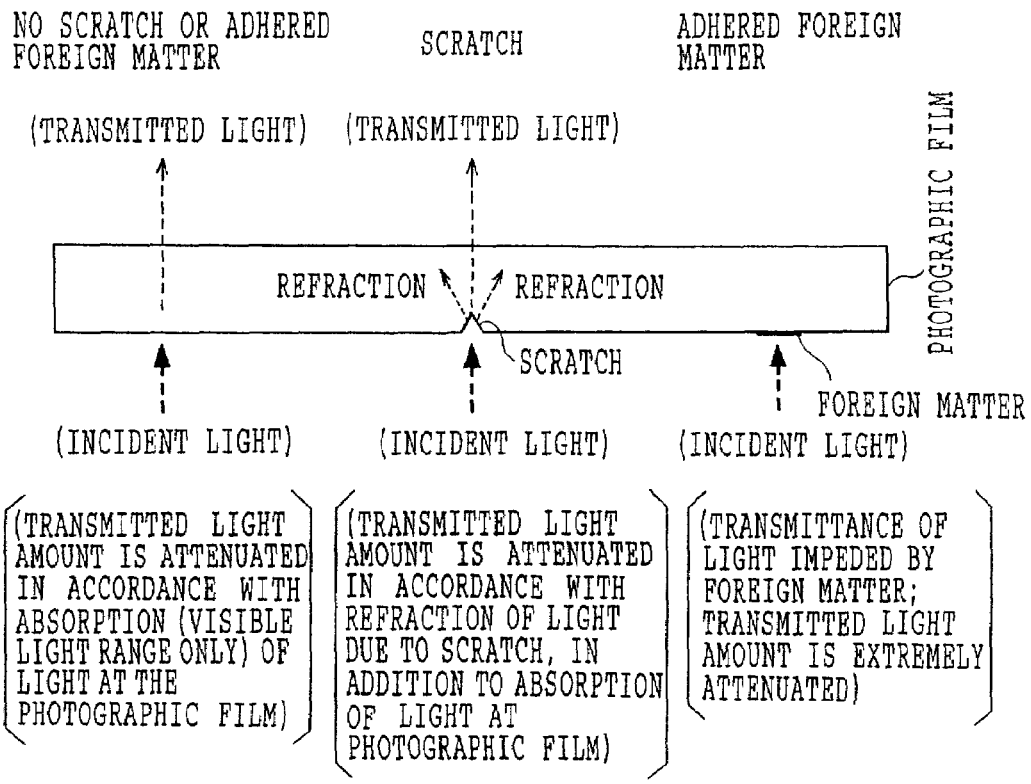
FIG. 6A is a schematic view showing transmittance of light at each of a place at which there is no scratch or foreign matter at a photographic film, a place at which there is a scratch in the photographic film, and a place at which foreign matter has adhered to the photographic film.

As shown in FIG. 6A, the transmitted light amount at the time when light is irradiated onto a place where there is no scratch or foreign matter on the surface of the photographic film is attenuated, with respect to the amount of light which is incident on the photographic film, by an amount of attenuation corresponding to the absorption of light by the photographic film. The wavelength region at which absorption of light at the photographic film arises is roughly the visible light region (in a case in which no IR image-copy occurs), and IR light of the infrared region is hardly absorbed at all. Thus, the transmitted light amount in a case in which IR light is irradiated onto a place where there is no scratch or foreign matter only varies slightly from the amount of incident light.

On the other hand, in a case in which light is irradiated onto a place where there is a scratch in the photographic film, a portion of the irradiated light is refracted by the scratch. Thus, the transmitted light amount at the time when light is irradiated onto a place where there is a scratch (the amount of light of the light transmitted rectilinearly through that place) is attenuated, with respect to the amount of light incident onto the photographic film, by an amount of attenuation which is obtained by adding the attenuation caused by refraction of light due to the scratch to the aforementioned attenuation caused by absorption of light by the photographic film. Note that FIG. 6A shows a case in which a scratch is formed at the light incident side, but the same holds for a case in which a scratch is formed at the light exiting side.

Refraction of light due to a scratch occurs with IR light as well. Thus, the transmitted light amount of IR light in a case in which the IR light is irradiated onto a place where a scratch is formed is attenuated by an amount of attenuation which corresponds to the attenuation caused by the refraction of light due to the scratch. The refraction of light due to the scratch becomes marked as the extent (the depth and the like) of the scratch increases. Thus, the transmitted light amount in a case in which IR light is irradiated onto a place where a scratch is formed decreases as the extent of the scratch increases. Accordingly, the extent of the scratch formed in the photographic film can be sensed on the basis of the amount of attenuation of the transmitted light amount of the IR light.

When light is irradiated onto a place where foreign matter such as dust or the like has adhered on the photographic film, the irradiated light is reflected by the foreign matter. Thus, the transmitted light amount of the light in a case in which light is irradiated onto a place where foreign matter has adhered is greatly attenuated by the foreign matter, although it depends on the size and the type (the light transmittance) of the foreign matter. The attenuating of the transmitted light amount in a case in which light is irradiated onto a place where foreign matter has adhered is the same for a case in which IR light is irradiated onto such a place.

As described above, the transmitted light amount in a case in which IR light passes through the photographic film varies only at places where a scratch is formed in or foreign matter has adhered to the photographic film. Even if an image is recorded on the photographic film, the transmitted light amount is not affected by changes in the transmission density of the image. Thus, by irradiating IR light onto the photographic film and detecting the transmitted light amount, a scratch or foreign matter on the photographic film can be detected.

Figure 7A:
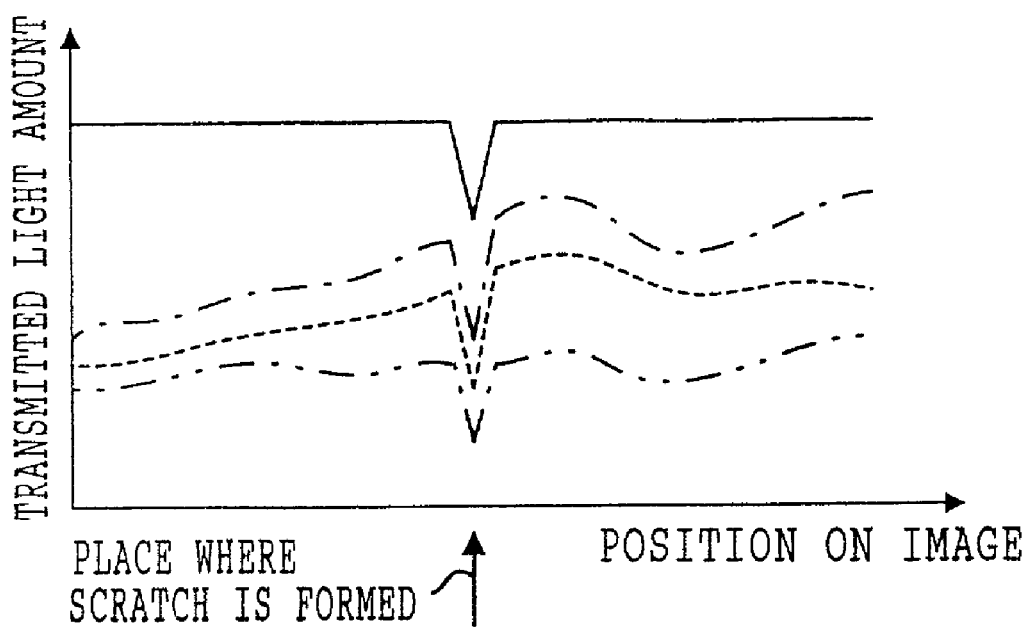
FIG. 7A is a graph showing an example of changes in transmitted light amounts of R light, G light, B light and IR light in a case in which a scratch is formed in a back surface.
Figure 7B:
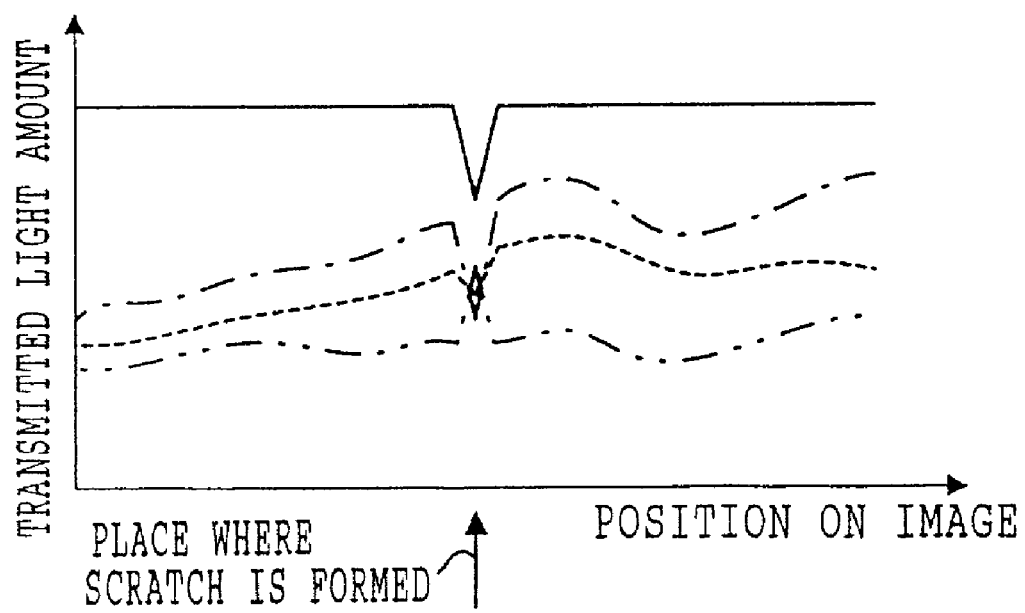
FIG. 7B is a graph showing an example of changes in transmitted light amounts of R light, G light, B light and IR light in a case in which a scratch is formed in an emulsion surface.

On the basis of the above, defective portion detecting processing is carried out in step 122 as follows. The transmitted light amount in a case in which IR light is irradiated onto a photographic film is, as described above, usually substantially constant regardless of the position on the image, and is low only at places where there is a scratch or foreign matter on the photographic film (see FIGS. 7A and 7B). Thus, in the present embodiment, in order to shorten the time required for the defective portion detecting processing, a predetermined filtering processing (e.g., processing corresponding to a high-pass filter or processing corresponding to a bandpass filter) is carried out on the IR data which corresponds to the region which is the object of processing set in step 112 or step 116. In this way, edge portions, at which changes in the transmitted light amount of IR light arise, can be extracted from the region which is the object of processing.

A defective portion arises due to a scratch formed in or foreign matter adhering to the photographic film 26. Although the sizes of scratches or foreign matter on image recording media such as photographic films are not constant, it is rare that the scratch or foreign matter is extremely large, and it is usually the case that the size of the scratch or foreign matter falls within a given range. Accordingly, the approximate extent of defective portions in image data varies in accordance with the pixel density of the image data on the image recording medium. As the pixel density of the image data changes, the slope of the change in the transmitted light amount of the IR light at the defective portion changes in the image data. Thus, the frequency band of an edge which corresponds to a defective portion also changes.

Thus, before edge extracting processing is carried out on the IR data, on the basis of the reading resolution and the electronically changed magnification for the image which is the object of processing, the pixel density on the photographic film 26 of the image which is represented by the image data (i.e., the pixel density of the image data) is computed. The frequency band which is to be extracted by the edge extracting processing is determined on the basis of the computed pixel density. Thereafter, edge extracting processing is carried out on the IR data which corresponds to the region which is the object of processing. In this way, regardless of the extent of the defective portion in the image data which varies in accordance with the pixel density of the image data, edges which correspond to defective portions existing in the region which is the object of processing can be appropriately extracted.

Among the pixels which are extracted as edges, pixels whose amount of change in the transmitted light amount is greater than or equal to a predetermined value are all detected as defective pixels belonging to a defective portion which is an object of correction. Respective pixels within a region whose entire periphery is surrounded by detected defective pixels are also included among the defective pixels. On the basis of the positional relationships among the defective pixels (e.g., whether defective pixels are adjacent or not), the defective pixels are classified into defective pixels belonging to the same defective portion. Information relating to the respective defective portions (e.g., information expressing the defective pixels belonging to each defective portion, or information expressing a reduced amount of the transmitted light amount of IR light at each defective pixel by using, as a reference, the transmitted light amount of IR light at a place where there is no scratch or foreign matter on the image which is the object of processing) is stored in the RAM 48 or the like.

In subsequent step 124, a determination is made as to whether there are pixels that have been detected as defective portions. If the answer to the determination is negative, there are no defective portions which are objects of correction in the image which is the object of processing. Thus, in step 130, stopping of execution of defect correction processing on the image which is the object of processing is reported to the image processor 40, and the defective portion correction condition judgment process is stopped. Further, in a case in which the answer to the determination in step 124 is affirmative, the routine moves on to step 126 where a correction amount for correcting each defective portion is computed for the defective portions which are the objects of correction detected by the defective portion detecting processing. First, the principles of defective portion correction will be described.

Figure 6B:
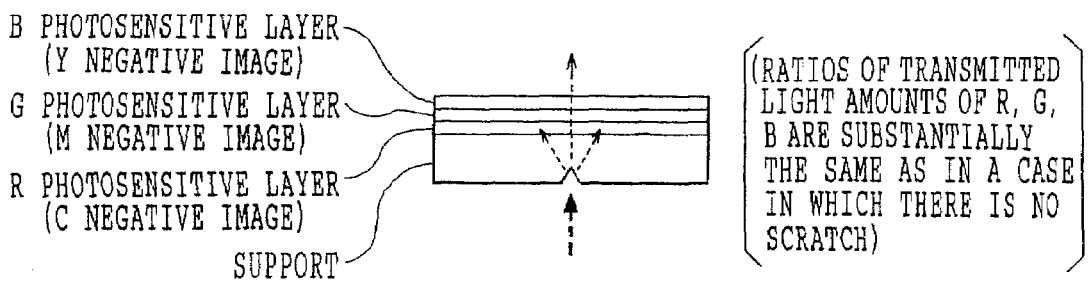
FIG. 6B is a schematic view showing transmittance of light in a case in which a scratch is formed in a back surface of a photographic film.

As shown in FIG. 6B, the emulsion layer of a photographic film is formed to include respective photosensitive layers of R, G, B. At a photographic film (a negative film), on which an image has been exposed and recorded and for which processings such as developing and the like have been carried out, a C negative image is formed at the R photosensitive layer, an M negative image is formed at the G photosensitive layer, and a Y negative image is formed at the B photosensitive layer. Among the visible lights which are transmitted through the photographic film, the R light is attenuated (absorbed) at the R photosensitive layer by an amount of attenuation corresponding to the transmission density of the C negative image, the G light is attenuated (absorbed) at the G photosensitive layer by an amount of attenuation corresponding to the transmission density of the M negative image, and the B light is attenuated (absorbed) at the B photosensitive layer by an amount of attenuation corresponding to the transmission density of the Y negative image.

As shown as an example in FIG. 6B, in a case in which a scratch is formed in the back surface at the opposite side of the emulsion surface, the ratio of the absorption of light at each of the R, G, B photosensitive layers with respect to the transmitted light is the same as in a case in which no scratch is formed. Namely, as shown in FIG. 6B, if the amount of incident light on the photographic film is I0, the transmitted light amounts of R light, G light, B light when no scratch is formed are I0R, I0G, I0B, then the amount of light which, when a scratch is formed, passes rectilinearly through the place where the scratch is formed and is incident on the emulsion layer is I1 (I1<I0:I0−I1 is the amount of attenuation of light due to the scratch), and the transmitted light amounts of R light, G light, B light when a scratch is formed are I1R, I1G, I1B, and the relationships of following formula (1) are established.

$$I0R/I0 \approx I1R/T1 \quad I0G/I0 \approx I1G/T1 \quad I0B/I0 \approx I1B/T1 \qquad (1)$$

Accordingly, only the brightness of a defective portion, which corresponds to a place where a scratch is formed on the back surface, changes as compared with a case in which no scratch is formed, and the color information of the image recorded on the photographic film is preserved. Thus, by applying a brightness adjusting method and adjusting the brightness of the defective portion region, the defective portion of the image represented by the image data can be corrected.

Figure 6C:
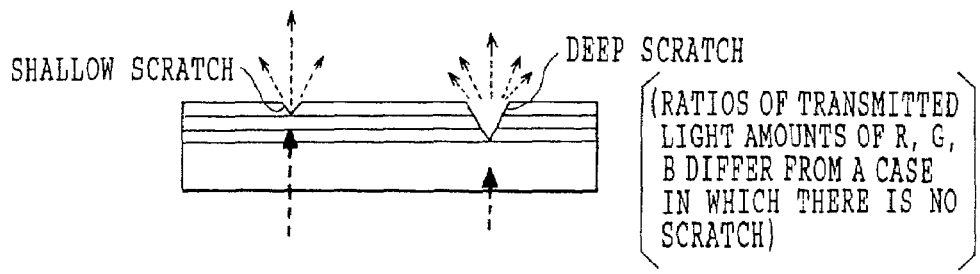
FIG. 6C is a schematic view showing transmittance of light in a case in which a scratch is formed in an emulsion surface of a photographic film.

On the other hand, in a case in which a scratch is formed in the emulsion surface as shown as an example in FIG. 6C, if the scratch is shallow, due to a portion of the photosensitive layers being scratched away, the ratios of absorption of light at the respective R, G, B photosensitive layers with respect to the transmitted light change from those in a case in which no scratch is formed. Further, if there is an extremely deep scratch such that all of the photosensitive layers have been scratched away, absorption of light at any of the photosensitive layers does not occur. Accordingly, in either case, the relationships of formula (1) are not established.

Thus, at a defective portion which corresponds to a place where a scratch is formed in the emulsion surface, regardless of the depth of the scratch, the brightness and color respectively change and color information of the image recorded on the photographic film is lost as compared with a case in which no scratch is formed. Therefore, even if the brightness is adjusted, it is difficult to precisely correct the defective portion. Thus, in correcting a defective portion which corresponds to a place where a scratch is formed in the emulsion surface, a correction method (interpolation method) is applied in which the brightness and the density of the defective portion are determined by interpolation from information of the regions surrounding the defective portion. Note that, also in cases of defective portions which arise due to foreign matter adhering to the photographic film, the brightness and color change as compared with a case in which no foreign matter adheres. Thus, an interpolation method can also be applied to cases of correcting such defective portions.

In step 126, first, for each defective portion which is an object of correction, a predetermined characteristic amount is computed in order to determine whether correction is to be carried out by applying the interpolation method, or whether correction is to be carried out by applying the brightness adjusting method. In the present embodiment, as an example of the predetermined characteristic amount, a characteristic amount is used which expresses the correlation of the changes in the transmitted light amounts of R light, G light and B light at the defective portion.

For example, in a case in which a scratch is formed in the back surface of the photographic film, the transmitted light amounts of R light, G light and B light at the place where the scratch is formed exhibit substantially similar changes. Thus, the correlation of the changes in the transmitted light amounts of R light, G light and B light is high. On the other hand, if a scratch is formed in the emulsion surface of the photographic film, as shown as an example in FIG. 7B, the changes in the transmitted light amounts of R light, G light and B light at the place where the scratch is formed are not constant, and the correlation of the changes in the transmitted light amounts of R light, G light and B light is low. (The same holds in a case in which foreign matter has adhered to the photographic film.)

FIG. 7 illustrates a typical case. In actuality, there are many cases in which it is not clear which correction method should be applied, such as when scratches are formed in both surfaces of the photographic film. However, if information relating to colors of the photographed subject remains in the R, G, B image data, it is preferable to use the brightness adjusting method. If this information does not remain, it is desirable to use the interpolation method. Thus, on the basis of a predetermined characteristic amount which expresses the correlation of the changes in the transmitted light amounts of R light, G light and B light at the defective portion (e.g., a value which integrates the differential values of the changes in the transmitted light amounts of R light, G light and B light), the correction method which should be applied can be appropriately determined for each of the defective portions.

For each of the defective portions which is an object of correction, the aforementioned predetermined characteristic amount is computed, set values of ranges of application of both correction methods (threshold values expressing the borders of the ranges of application of both correction methods) are fetched, and the predetermined characteristic amount of the defective portion is compared with each of the set values. In this way, for each of the defective portions, it is judged whether correction is to be carried out by applying the interpolation method or whether correction is to be carried out by applying the brightness adjustment method.

Then, for a defective portion for which it is judged that correction is to be carried out by applying the interpolation method, a correction value is computed by applying the interpolation method. Namely, the brightness and the color of the defective portion which is the object of correction are newly computed by interpolation from the brightnesses and colors of the surrounding regions of that defective portion. If the value (the density values of R, G, B may be used, or a value expressing the hue/lightness/saturation may be used) of each pixel within the defective portion as determined by the interpolation computation is D1, the original value of each pixel is D2, and the degree of correction is α, then a correction value D3 of each pixel within the defective portion is determined in accordance with formula (2).

$$D3 = \alpha \cdot D1 + (1-\alpha)D2 \quad (2)$$

The above-described processing is carried out on each defective portion for which it is judged that correction is to be carried out by applying the interpolation method, and a correction value for each defective portion is determined.

For each defective portion for which it is judged that correction is to be carried out by applying the brightness adjusting method, a correction value is computed by applying the brightness adjusting method. Namely, a brightness correction amount of the defective portion is computed on the basis of the amount of change in the transmitted light amount of the IR light at the defective portion which is the object of correction. If the brightness value of each pixel in the defective portion which is corrected in accordance with the brightness correction amount is L1, the original brightness value of each pixel is L2, and the currently set value of the "degree of defective portion correction" is α, then a correction value (brightness value) L3 of each pixel within the defective portion is determined in accordance with formula (3).

$$L3 = \alpha \cdot L1 + (1-\alpha)L2 \quad (3)$$

The above-described processing is carried out on each of the defective portions for which it is judged that correction is to be carried out by applying the brightness correction method, and a correction value for each defective portion is determined. Note that correction values for each defective portion may be determined by applying both correction methods, and a weighted average value of the correction values may be used as the final correction value.

When correction values for all of the defective portions which are objects of correction have been computed, the routine moves on to step 128 where the correction value for each defective portion is reported to the image processor 40 together with information expressing the positions of the defective portions (e.g., the addresses of the defective pixels forming the respective defective portions), and the defective portion correction condition judgment process ends.

At the image processor 40, various types of image processings are carried out, under the processing conditions determined by set-up computation at the control section 42, on the fine scan image data of the image which is the object of processing. Then, only for images for which cancellation of defect correction processing is not notified from the control section 42, defect correction processing is carried out to correct the defective portions in accordance with the correction values reported from the control section 42 (specifically, the values of the respective defective pixels belonging to the defective portions are replaced with the reported corrected pixel values). In this way, the defective portions which are the objects of correction are automatically corrected at images for which proscription of defect correction processing has not been reported.

As described above, in the present embodiment, detection and correction of defective portions are not carried out for images for which there is a high possibility that the image quality will deteriorate or that processing will require more time than is suitable, due to detection and correction of defective portions (images for which the determination in any of steps 104, 114 or 120 is affirmative). Thus, a deterioration in image quality, and a marked lowering of the processing capabilities of the image processing system 10 due to an extremely long time being required for defective portion detection and correction can be prevented.

Second Embodiment

Next, a second embodiment of the present invention will be described. Because the present second embodiment is structured in the same way as the first embodiment, the same portions are denoted by the same reference numerals, and description thereof is omitted. Hereinafter, explanation will be given only of the portions of the defective portion correction condition judgment process relating to the present second embodiment that differ from the defective portion correction condition judgment process described in the first embodiment.

In the defective portion correction condition judgment process relating to the first embodiment, at the time of detecting a defective portion, edge extracting processing is carried out on the IR data. However, in the defective portion correction condition judgment process of the present second embodiment, in order to use an edge, which is extracted from the image, in determining whether or not an IR image is formed, an edge is extracted from both the IR data and the visible light image data.

Namely, when the processing of step 112 or step 116 is carried out, on the basis of the reading resolution and the electronically changed magnification for the image which is the object of processing, the pixel density on the photographic film 26 of the image represented by the image data (i.e., the pixel density of the image data) is computed (step 134). A frequency band which is to be extracted in the edge extracting processing is determined in accordance with the pixel density (step 136). Edge extracting processing is then carried out both on the IR data which corresponds to the region which is the object of processing set in step 112 or step 116, and on the visible light image data which corresponds to the region which is the object of processing (step 138). In step 140, a correlation value of the edges which are extracted from the visible light image data and the IR data is computed. In subsequent step 142, a determination is made as to whether or not the computed correlation value is greater than or equal to a predetermined value.

In a case in which an IR image as well is formed on the photographic film 26 which is the object of processing, the IR image exhibits changes in density which are similar to those of the visible light image. Thus, the correlation value of the edge which is extracted from the IR data and the edge which is extracted from the visible light image data is an extremely high value. Thus, by the above-described steps 138 through 142, it can be accurately determined whether or not an IR image is formed on the photographic film 26 which is the object of processing, i.e., whether or not the image which is the object of processing is suited for defective portion detection and correction.

Edge extracting processing is generally carried out by extracting frequency components corresponding to at least one frequency band in a range from an intermediate frequency band to a high frequency band. In the present embodiment, the edge extraction is carried out by carrying out a filtering processing corresponding to a high-pass filter. In step 136, the frequency band which is to be extracted is determined such that, as the pixel density of the image data decreases, the cut-off frequency of the high-pass filter decreases (i.e., the frequency band which is to be extracted in the edge extracting processing widens toward the low frequency side).

In this way, by removing the low frequency band from the IR data and the visible light image data and computing the correlation value of the extracted edges, the effect on the correlation value of an offset between the density of the IR image and the density of the image which is the object of processing (i.e., a DC component of the density difference) can be reduced. Further, when the determination in step 142 is negative (when it can be determined that no IR image is formed on the photographic film 26 which is the object of processing), the routine moves on to step 122 and defective portion detecting processing is carried out by using the edges extracted in step 138. In step 136, which was described previously, the frequency band which is extracted in the edge extracting processing is changed in accordance with the pixel density of the image data. Thus, regardless of the scale of the defective portion on the image data which changes in accordance with the pixel density of the image data, an edge which corresponds to a defective portion which exists in the region which is the object of processing can be properly extracted.

In the second embodiment, the correlation value is determined by extracting frequency components corresponding to a single frequency band (a frequency band which is higher than a predetermined cut-off frequency). However, the present invention is not limited to the same. Frequency components corresponding to a plurality of different frequency bands may respectively be extracted, and by using the correlation values for the respective frequency components, it can be judged whether or not an IR image is formed.

In the above explanation, the interpolation method and the brightness adjusting method are described as examples of the defective portion correcting method. However, the present invention is not limited to the same. A so-called vignetting method can be added in which the defective portion is vignetted by applying a low-pass filter or the like.

Further, an example is described above in which reading of R, G, B is carried out at the time of prescanning, and reading of R, G, B, IR is carried out at the time of fine scanning. However, the present invention is not limited to the same, and it is possible to carry out IR reading only at the time of prescanning, or to carry out IR reading both at the time of prescanning and at the time of fine scanning. Further, it is possible to carry out reading only one time.

Moreover, a structure is described above in which the image is read by an area sensor (the area CCD 30) in which photoelectric converting cells are arranged in a matrix form. However, the present invention is not limited to the same, and the image may be read by a line sensor in which the photoelectric converting cells are arranged in a line. Further, although a structure is described above in which the image is read by photoelectrically converting the light which passes through the photographic film, the present invention is not limited to the same. A structure may be employed in which the image is read by photoelectrically converting light which is reflected by the photographic film. Further, it goes without saying that the image recording medium of the present invention is not limited to a photographic film, and a photographic photosensitive material other than a photographic film, regular paper, an OHP sheet, or the like may be used as the image recording medium.

As described above, in the present invention, it is judged whether or not the image which is the object of processing is suited for defective portion detection and correction. If it is judged that the image is not suited for defective portion detection and correction, either defective portion detection and correction are prohibited, or defective portion detection and correction are carried out only on regions other than regions which have been judged as being unsuited for defective portion detection and correction. Thus, an excellent effect is achieved in that it is possible to pre-emptively prevent a deterioration in image quality from arising and more time than is suitable being required for processing, due to the defect detection-correction processing.

Moreover, the image information which is the object of processing may be image information which is obtained by photoelectrically converting visible light which is transmitted through or reflected by the image recording medium. On the basis of the results of photoelectrically converting the invisible light which is transmitted through or reflected by the image recording medium, it can be judged whether or not the image which is the object of processing is suited for defective portion detection and correction. Thus, in addition to the aforementioned effects, there is the effect that the determination as to whether the image which is the object of processing is suited for defective portion detection and correction or not can be carried out accurately.

On the basis of the density distribution range of the invisible light image which is represented by the invisible light image information, it may be judged whether or not the image which is the object of processing is suited for defective portion detection and correction. Thus, in addition to the aforementioned effects, there is the effect that the determination as to whether the image which is the object of processing is suited for defective portion detection and correction or not can be carried out easily and accurately.

Further, on the basis of a correlation value between the invisible light image information and the image information, it may be judged whether or not the image which is the object of processing is suited for defective portion detection and correction. Thus, in addition to the aforementioned effects, there is the effect that the determination as to whether the image which is the object of processing is suited for defective portion detection and correction or not can be carried out even more accurately.

In this case, the correlation value between the invisible light image information and the image information may be computed for at least one frequency band from the intermediate frequency band to the high frequency band. On the basis of the computed correlation value, it can be determined whether or not the image which is the object of processing is suited for defective portion detection and correction. Thus, in addition to the aforementioned effects, there is the effect that the determination as to whether the image which is the object of processing is suited to defective portion detection and correction or not can be carried out easily and accurately.

Further, a determination may be made as to whether a non-image portion at which the transmitted light amount or the reflected light amount of the invisible light is extremely low or extremely high, and whose surface area is a predetermined value or more, exists in the image which is the object of processing. It can thereby be judged whether or not the image which is the object of processing is suited for defective portion detection and correction. Control is carried out such that defective portion detection and correction are carried out only for regions other than the non-image portion of the image which is the object of processing. Thus, in addition to the aforementioned effects, there is the effect that defective portions of regions corresponding to the image which is the object of defective portion correction (i.e., the regions other than the non-image portion) can be corrected, without there being a deterioration in image quality and without processing requiring more time than is preferable due to the defect detection-correction processing.

Further, the type of the information recording medium on which the image which is the object of processing is recorded may be detected. In a case in which the detected type of the information recording medium is a type which is registered in advance, it is judged that the image which is the object of processing is not suited for defective portion detection and correction. Thus, in addition to the aforementioned effects, there is the effect that the determination as to whether the image which is the object of processing is suited for defective portion detection and correction or not can be carried out by a simple processing in a short time.

Further, recorded on a recording medium may be a program for executing, at a computer, a process including a first step of determining whether or not the image which is the object of processing is suited for defective portion detection and correction, and a second step of, in a case in which it is determined that the image is not suited for defective portion detection and correction, either prohibiting defective portion detection and correction, or carrying out defective portion detection and correction only on regions other than regions which have been judged as being unsuited for defective portion detection and correction. Thus, an excellent effect is achieved in that the determination as to whether the image which is the object of processing is suited for defective portion detection and correction or not can be carried out accurately.

What is claimed is:

1. An image processing device, comprising:
   detection-correction means for carrying out detection of one or more defective portions of an image represented by image information and carrying out correction for the one or more defective portions;
   judgment means for carrying out determination of whether or not the image is suited for detection and correction by the detection-correction means; and
   control means for controlling the detection-correction means such that if the judgment means determines that the image is not suited for detection and correction by the detection-correction means, then either said detection and correction is cancelled or said detection and correction is performed only for a region of the image other than a region which is determined by the judgment means to be unsuited for said detection and correction,
   wherein the one or more defective portions are caused by a scratch or foreign matter on an image recording material,
   wherein the image processing device further comprises a memory for registering types of image recording media, and
   wherein the judgment means receives information representing a type of an image recording medium on which the image is recorded and, if the type matches a type in the register, determines that the image is not suited for said detection and correction.

2. The image processing device according to claim 1, wherein the image information comprises image information obtained by irradiating light onto the image recording material and photoelectrically converting visible light that has been one of transmitted through and reflected by an image recording medium, the judgment means receives information comprising invisible light image information obtained by irradiating light onto the image recording material and photoelectrically converting invisible light that has been one of transmitted through and reflected by the image recording medium, and the judgment means carries out said determination on the basis of the information received thereby.

3. The image processing device according to claim 2, wherein the judgment means carries out said determination on the basis of a density distribution range of an invisible light image represented by the invisible light image information.

4. The image processing device according to claim 2, wherein the judgment means carries out said determination on the basis of a correlation value between the image information and the invisible light image information.

5. The image processing device according to claim 4, wherein the judgment means calculates the correlation value for at least one frequency band in a range from an intermediate frequency band to a high frequency band.

6. The image processing device according to claim 2, wherein the judgment means carries out said determination by judging, on the basis of the invisible light image information, whether or not there is in the image a region at which region the amount of the invisible light that has been one of transmitted and reflected is one of extremely low and extremely high and which region has a surface area of at least a predetermined value, and the control means controls the detection-correction means such that said detection and correction is performed only for a region of the image other than said region at which the amount of the invisible light that has been one of transmitted and reflected is one of extremely low and extremely high and which region has a surface area of at least a predetermined value.

7. An apparatus for correcting an image defect due to a defect of an image recording medium, comprising:
 a judgment device configured for determining whether the defect of the image recording medium can be detected;
 a defective portion detector configured for detecting the defect of the image recording medium; and
 a defect corrector configured for correcting the image defect due to the defect of the image recording medium,
 wherein the defective portion detector detects the defect of the image recording medium based on the judgment device determining that the defect of the image recording medium can be detected,
 wherein the defect corrector corrects the image defects based on the defective portion detector detecting the defect of the image recording medium,
 wherein the defect comprises a scratch or foreign matter on the image recording medium, and
 wherein the judgment device is configured for:
  determining whether the image recording medium includes a non-image region:
  determining a region of processing to be an entire image surface of the image recording medium if it is determined that the image recording medium does not include the non-image region;
  determining whether detection and correction of the image defect should be canceled based on a user's preference when it is determined that the image recording medium includes the non-image region:
  determining the region of processing is the image surface of the image recording medium other than the non-image region if it is determined that the detection and correction of defects should not be canceled; and
  determining whether the defect of the image recording medium can be detected based on characteristics of the region of processing.

8. The apparatus of claim 7, wherein the judgment device is configured for determining whether the image recording medium is pre-registered to be a type of recording medium such that the defect of the image recording medium cannot be detected.

9. The apparatus of claim 8, wherein the registered type of the image recording medium includes a photographic film that is sensitive to infrared light so that an infrared image is also formed on the photographic film along with a visible light image at a time the photographic film is exposed to capture an image of an object.

10. The apparatus of claim 7, wherein the judgment device is configured to determine whether the image recording medium includes the non-image region by:
 reading transmitted infrared light data from the image recording medium; and
 determining that the image recording medium does include the non-image region when the transmitted infrared light data of a predetermined value or less is continuous over a predetermined amount of surface area of the image recording medium or more.

11. The apparatus of claim 7, wherein the judgment device is configured to determine whether the defect of the image recording medium can be detected based on the characteristics of the region of processing by:
 computing a density distribution width of an infrared light image in the region of processing;
 determining that the defect in the image recording medium can be detected when the density distribution width of the infrared light image in the region of processing is less than or equal to a predetermined distribution width value.

12. The apparatus of claim 7, wherein the judgment device is configured to determine whether the defect of the image recording medium can be detected based on the characteristics of the region of processing by:
 computing a pixel density of visible light data and of infrared light data in the region of processing;
 extracting a frequency band for edge processing based on the pixel densities of the visible light data and the infrared light data;
 computing a correlation value of the edges extracted from the visible light data and the edges extracted from the infrared light data;
 determining that the defect in the image recording medium cannot be detected when the correlation value is greater than or equal to a predetermined correlation value.

13. The apparatus of claim 7, wherein the defect corrector is configured for:
 determining a correction needed to correct a defective portion of the image recording medium; and
 applying the correction to the defective portion of the image recording medium.

14. The apparatus of claim 13, wherein the defect corrector is configured for applying the correction by:
 adjusting a brightness of pixels of visible color data corresponding to the defective portion of the image recording medium, or
 interpolating the visible color data to the pixels corresponding to the defective portion of the image recording medium based on the visible color data of pixels neighboring the defective portion, or both.

15. The apparatus of claim 13, wherein the defect corrector is configured for adjusting the brightness of the pixels of the visible color data corresponding to the defective portion of the image recording medium based on an amount of change in a transmittance of infrared light corresponding to the defective portion.

16. The apparatus of claim 14, wherein the defect corrector is configured for interpolating the visible color data each color where the color recording layer of the defective portion of the image recording layer is damaged.

17. An apparatus for correcting an image defect due to a defect of an image recording medium, comprising:
 a judgment device configured for determining whether the defect of the image recording medium can be detected;

a defective portion detector configured for detecting the defect of the image recording medium; and a defect corrector configured for correcting the image defect due to the defect of the image recording medium, wherein the defective portion detector detects the defect of the image recording medium based on the judgment device determining that the defect of the image recording medium can be detected, wherein the defect corrector corrects the image defects based on the defective portion detector detecting the defect of the image recording medium, wherein the defect comprises a scratch or foreign matter on the image recording medium, and wherein the defective portion detector is configured for:
 detecting a change in an amount of transmitted infrared light in a region of processing, wherein the region of processing is a region of the image recording medium where visible light image data is recorded; and determining that the defect of the recording image is detected in a portion of the region of processing when the change in the amount of transmitted infrared light in the portion is greater than or equal to an allowed change amount of the transmitted infrared light.

18. The apparatus of claim 17, wherein the defective portion detector is configured for detecting the change in the amount of transmitted infrared light by edge processing.

19. The apparatus of claim 17, wherein the defective portion detector is configured for calculating the allowed change amount of the transmitted infrared light based on a reading resolution of an image recording medium reading device.

20. The apparatus of claim 19, wherein the defective portion detector is configured for calculating the allowed change amount of the transmitted infrared light based further on a magnification of a visible image recorded on the image recording medium.

21. A method for correcting an image defect due to a defect of an image recording medium, comprising:
 determining whether the defect of the image recording medium can be detected;
 detecting the defect of the image recording medium if it is determined that the defect of the image recording medium can be detected; and
 correcting the image defect due to the defect of the image recording medium based on the detected defect,
 wherein the defect comprises a scratch or foreign matter on the image recording medium, and
 wherein the step for determining whether the defect of the image recording medium can be detected comprises:
  determining whether the image recording medium includes a non-image region;
  determining a region of processing to be an entire image surface of the image recording medium if it is determined that the image recording medium does not include the non-image region;
  determining whether detection and correction of the image defect should be canceled based on a user's preference when it is determined that the image recording medium includes the non-image region;
  determining the region of processing is the image surface of the image recording medium other than the non-image region if it is determined that the detection and correction of defects should not be canceled; and
  determining whether the defect of the image recording medium can be detected based on characteristics of the region of processing.

22. The method of claim 21, wherein the step for determining whether the defect of the image recording medium can be detected comprises determining whether the image recording medium is pre-registered to be a type of recording medium such that the defect of the image recording medium cannot be detected.

23. The apparatus of claim 22, wherein the registered type of the image recording medium includes a photographic film that is sensitive to infrared light so that an infrared image is also formed on the photographic film along with a visible light image at a time the photographic film is exposed to capture an image of an object.

24. The method of claim 21, wherein the step of determining whether the image recording medium includes the non-image region comprises:
 reading transmitted infrared light data from the image recording medium; and
 determining that the image recording medium does include the non-image region when the transmitted infrared light data of a predetermined value or less is continuous over a predetermined amount of surface area of the image recording medium or more.

25. The method of claim 21, wherein the step of determining whether the defect of the image recording medium can be detected based on the characteristics of the region of processing comprises:
 computing a density distribution width of an infrared light image in the region of processing;
 determining that the defect in the image recording medium can be detected when the density distribution width of the infrared light image in the region of processing is less than or equal to a predetermined distribution width value.

26. The method of claim 21, wherein the step of determining whether the defect of the image recording medium can be detected based on the characteristics of the region of processing includes:
 computing a pixel density of visible light data and of infrared light data in the region of processing;
 extracting a frequency band for edge processing based on the pixel densities of the visible light data and the infrared light data;
 computing a correlation value of the edges extracted from the visible light data and the edges extracted from the infrared light data;
 determining that the defect in the image recording medium cannot be detected when the correlation value is greater than or equal to a predetermined correlation value.

27. The method of claim 21, wherein the step of correcting the image defect due to the defect of the image recording medium based on the detected defect comprises:
 determining a correction needed to correct a defective portion of the image recording medium; and
 applying the correction to the defective portion of the image recording medium.

28. The method of claim 27, wherein the step for applying the correction comprises:
 adjusting a brightness of pixels of visible color data corresponding to the defective portion of the image recording medium, or
 interpolating the visible color data to the pixels corresponding to the defective portion of the image recording medium based on the visible color data of pixels neighboring the defective portion, or both.

29. The method of claim 28, wherein the step for adjusting the brightness of the pixels of the visible color data corresponding to the defective portion of the image recording medium comprises basing the amount of the brightness adjustment on an amount of change in a transmittance of infrared light corresponding to the defective portion.

30. The apparatus of claim 28, wherein the step of interpolating the visible color data to the pixels corresponding to the defective portion of the image recording medium comprises interpolating the visible color data each color where the color recording layer of the defective portion of the image recording layer is damaged.

31. A method for correcting an image defect due to a defect of an image recording medium, comprising:
   determining whether the defect of the image recording medium can be detected,
   detecting the defect of the image recording medium if it is determined that the defect of the image recording medium can be detected; and
   correcting the image defect due to the defect of the image recording medium based on the detected defect,
   wherein the defect comprises a scratch or foreign matter on the image recording medium, and
   wherein the step of detecting the defect of the image recording medium comprises:
      detecting a change in an amount of transmitted infrared light in a region of processing, wherein the region of processing is a region of the image recording medium where visible light image data is recorded; and
      determining that the defect of the recording image is detected in a portion of the region of processing when the change in the amount of transmitted infrared light in the portion is greater than or equal to an allowed change amount of the transmitted infrared light.

32. The method of claim 31, wherein the step of detecting the change in the amount of transmitted infrared light comprises edge processing transmitted infrared light data.

33. The method of claim 31, further comprising calculating the allowed change amount of the transmitted infrared light based on a reading resolution of an image recording medium reading device.

34. The method of claim 33, wherein the step for calculating the allowed change amount of the transmitted infrared light is based further on a magnification of a visible image recorded on the image recording medium.

* * * * *